United States Patent
Misawa

(10) Patent No.: US 7,856,258 B2
(45) Date of Patent: Dec. 21, 2010

(54) PORTABLE DEVICE

(75) Inventor: Atsushi Misawa, Asaki (JP)

(73) Assignee: FUJIFILM Corporation, Tokyo (JP)

( * ) Notice: Subject to any disclaimer, the term of this patent is extended or adjusted under 35 U.S.C. 154(b) by 527 days.

(21) Appl. No.: 11/864,534

(22) Filed: Sep. 28, 2007

(65) Prior Publication Data

US 2008/0151481 A1 Jun. 26, 2008

(30) Foreign Application Priority Data

Sep. 28, 2006 (JP) .............................. 2006-265495

(51) Int. Cl.
*H04M 1/00* (2006.01)
(52) U.S. Cl. ................ 455/575.3; 455/575.1; 455/90.3; 361/681
(58) Field of Classification Search .............. 455/575.1, 455/566, 564, 90.3, 550.1, 575.3, 556.1; 379/433.04, 433.13, 451; 348/333.06; 361/683, 361/681; 16/330, 341, 367
See application file for complete search history.

(56) References Cited

U.S. PATENT DOCUMENTS

| | | | | |
|---|---|---|---|---|
| 5,196,659 | A * | 3/1993 | Neubauer | 200/61.27 |
| 6,628,970 | B2 * | 9/2003 | Nishiyama et al. | 455/564 |
| 7,174,195 | B2 * | 2/2007 | Nagamine | 455/575.1 |
| 7,194,290 | B2 * | 3/2007 | Matsunami | 455/575.1 |
| 2003/0203747 | A1 * | 10/2003 | Nagamine | 455/575.3 |
| 2004/0137940 | A1 * | 7/2004 | Matsunami | 455/550.1 |
| 2004/0202316 | A1 * | 10/2004 | Abe et al. | 379/451 |
| 2005/0050687 | A1 * | 3/2005 | Shiba | 16/367 |
| 2005/0055806 | A1 * | 3/2005 | Shiba | 16/341 |
| 2005/0125570 | A1 * | 6/2005 | Olodort et al. | 710/15 |
| 2005/0134717 | A1 * | 6/2005 | Misawa | 348/333.06 |
| 2005/0198779 | A1 * | 9/2005 | Jung et al. | 16/367 |
| 2007/0097611 | A1 * | 5/2007 | Takamori et al. | 361/683 |
| 2007/0293283 | A1 * | 12/2007 | Inubushi et al. | 455/575.1 |
| 2008/0076490 | A1 * | 3/2008 | Kosugi | 455/575.3 |

FOREIGN PATENT DOCUMENTS

CN 1610356 A 4/2005

(Continued)

OTHER PUBLICATIONS

Korean Notice of Argument Submission, dated Feb. 24, 2009, issued in corresponding Korean Application No. 2007-98445, 9 pages, English and Korean.

(Continued)

*Primary Examiner*—Tan Trinh
(74) *Attorney, Agent, or Firm*—Sughrue Mion, PLLC

(57) ABSTRACT

The portable device includes: a first casing; a second casing; and a hinge which joins the first and second casings, the first and second casings being capable of turning on the hinge to open and close with respect to each other, wherein when the portable device is in a closed state where the first and second casings close, a first part of the first casing and a first part of the second casing face each other, a second part of the first casing protrudes from behind the second casing, and a second part of the second casing protrudes from behind the first casing, the second parts of the first and second casings being opposite to each other across the first parts of the first and second casings.

22 Claims, 26 Drawing Sheets

FOREIGN PATENT DOCUMENTS

| | | |
|---|---|---|
| EP | 1357726 A1 | 10/2003 |
| JP | 2002-101169 A | 4/2002 |
| JP | 2002-135380 A | 5/2002 |
| JP | 2002-232538 A | 8/2002 |
| JP | 2003319043 A | 11/2003 |
| JP | 2004207961 A | 7/2004 |
| JP | 2004215180 A | 7/2004 |
| JP | 2005159390 A | 6/2005 |
| JP | 2006-197044 A | 7/2006 |

OTHER PUBLICATIONS

CN Notification of the First Office Action, dated Apr. 14, 2010, in corresponding CN Application No. 200710140665.2, 17 pages in English and Chinese.

JP Notice of Reasons for Rejection, dated May 11, 2010, issued in corresponding JP Application No. 2006-265495, 4 pages in English and Japanese.

* cited by examiner

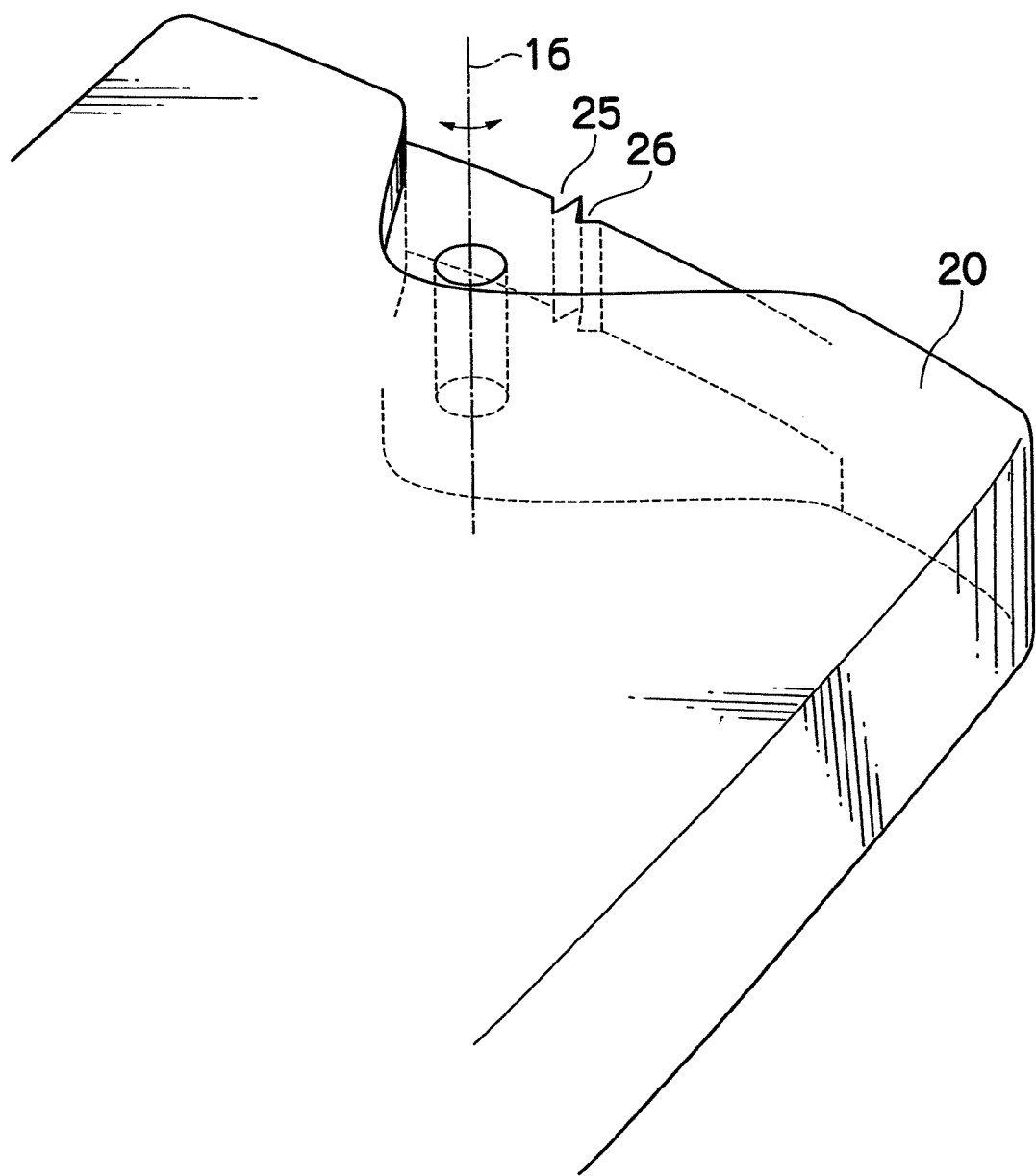

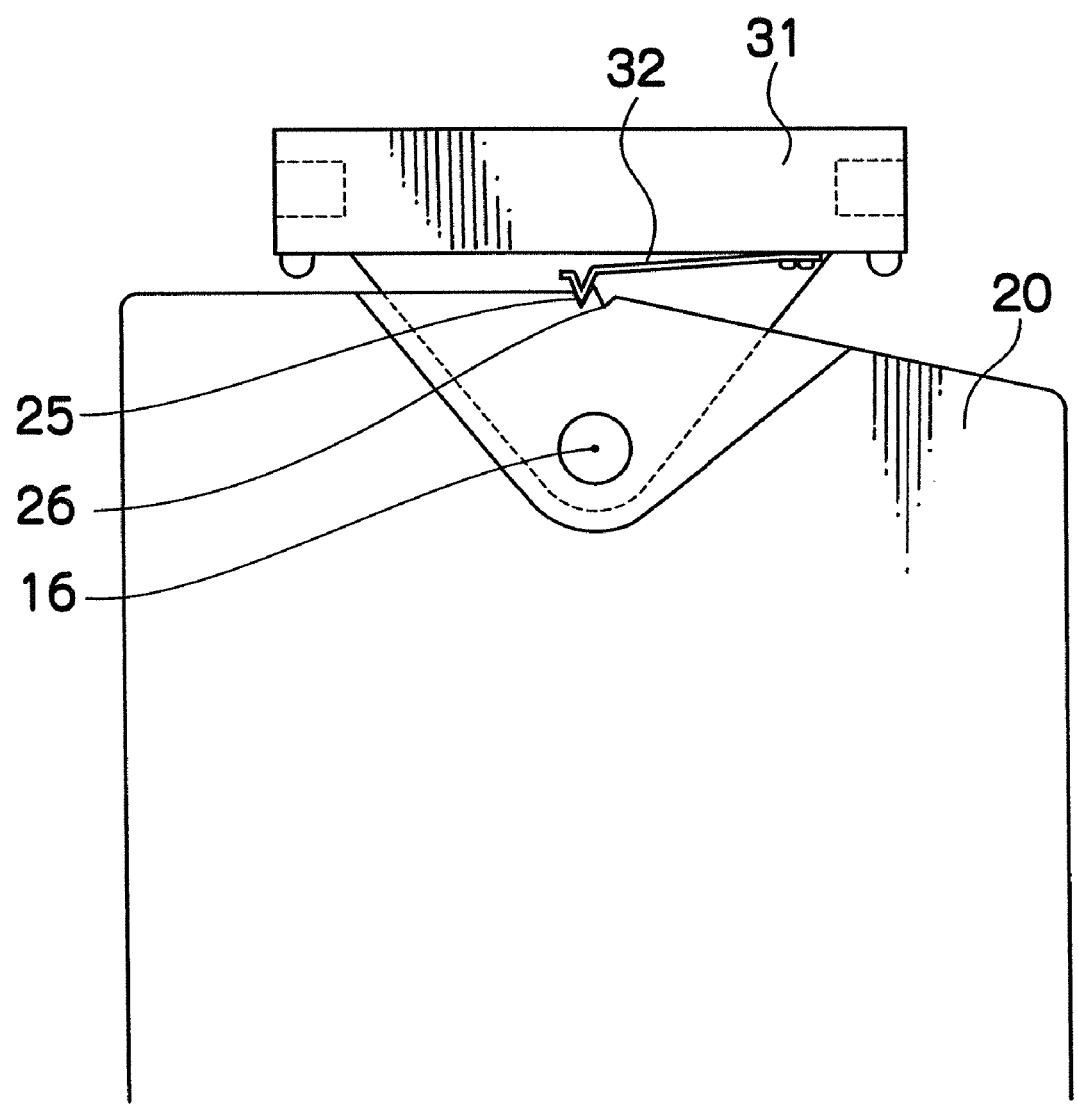

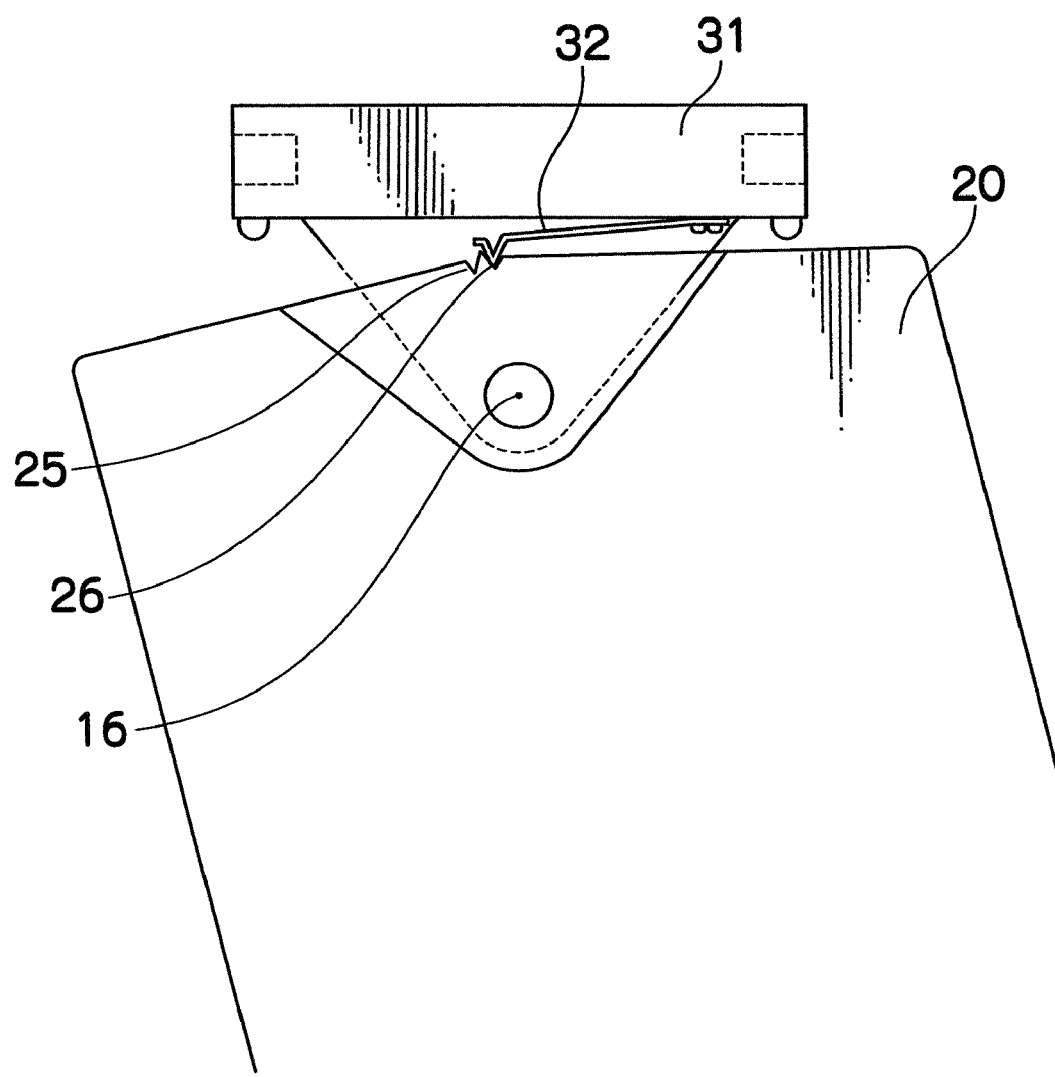

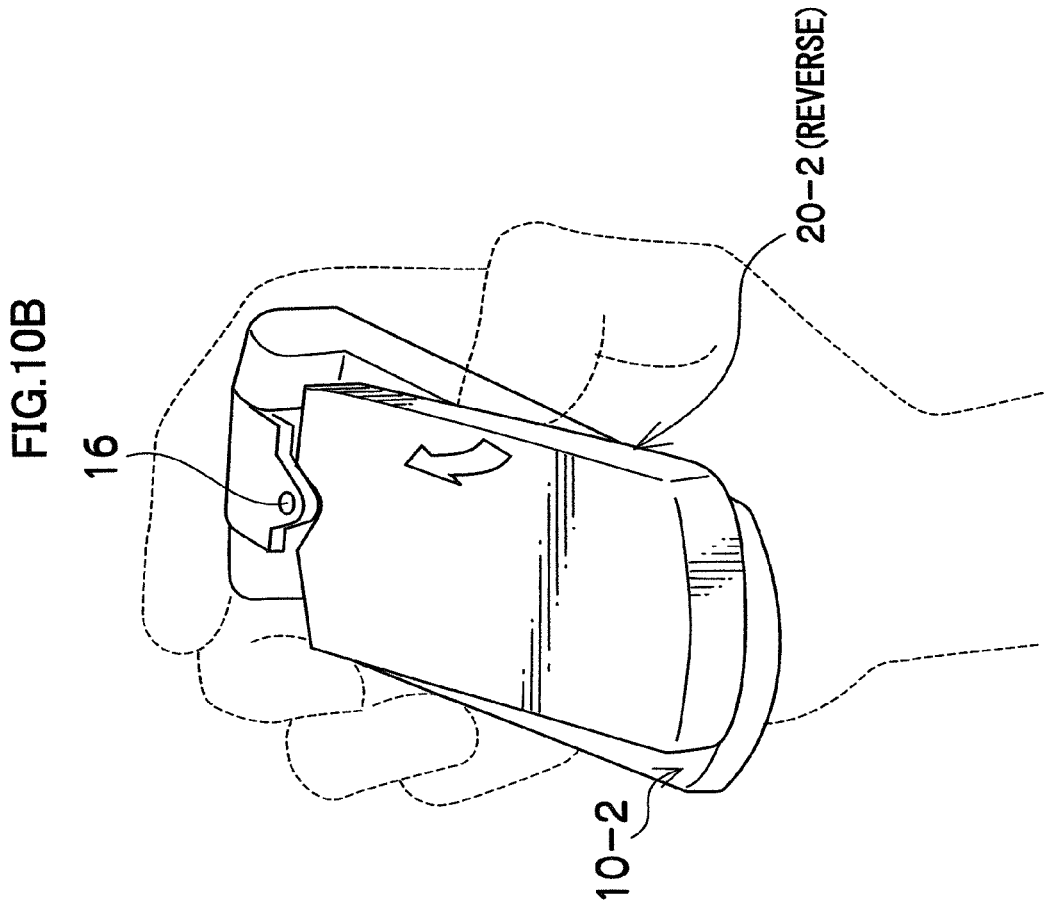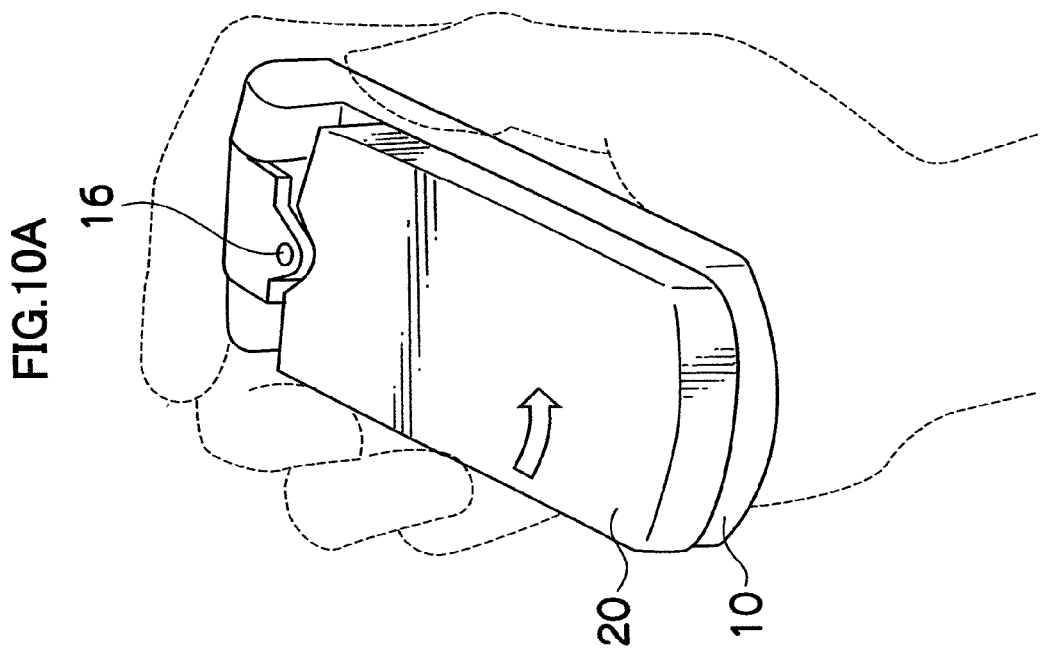

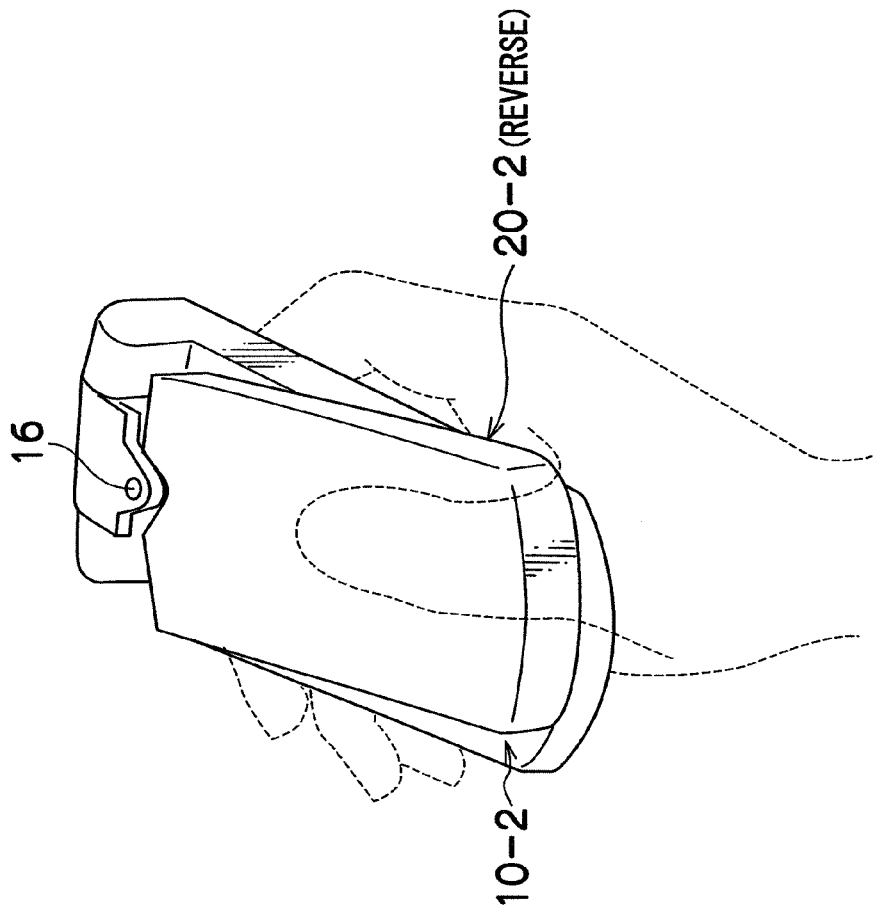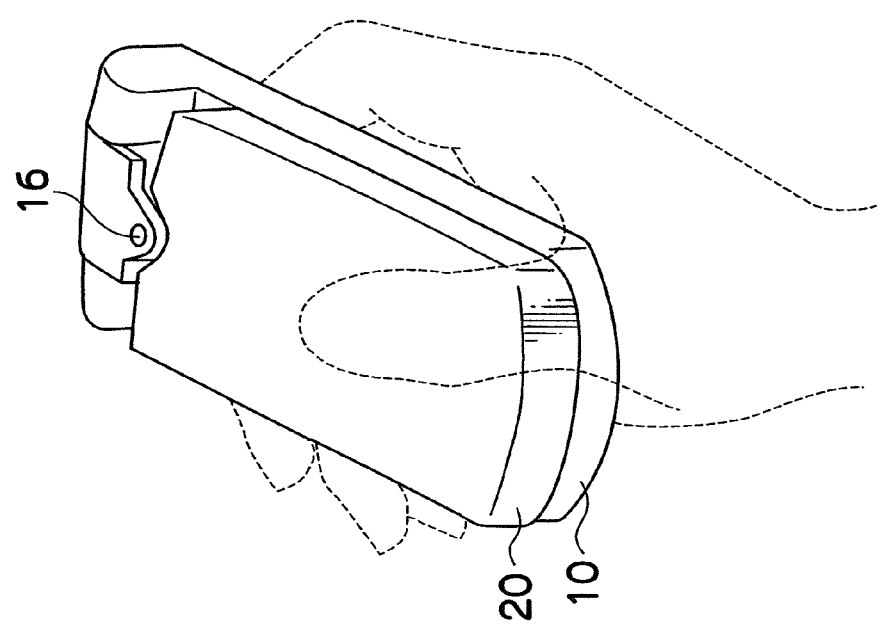

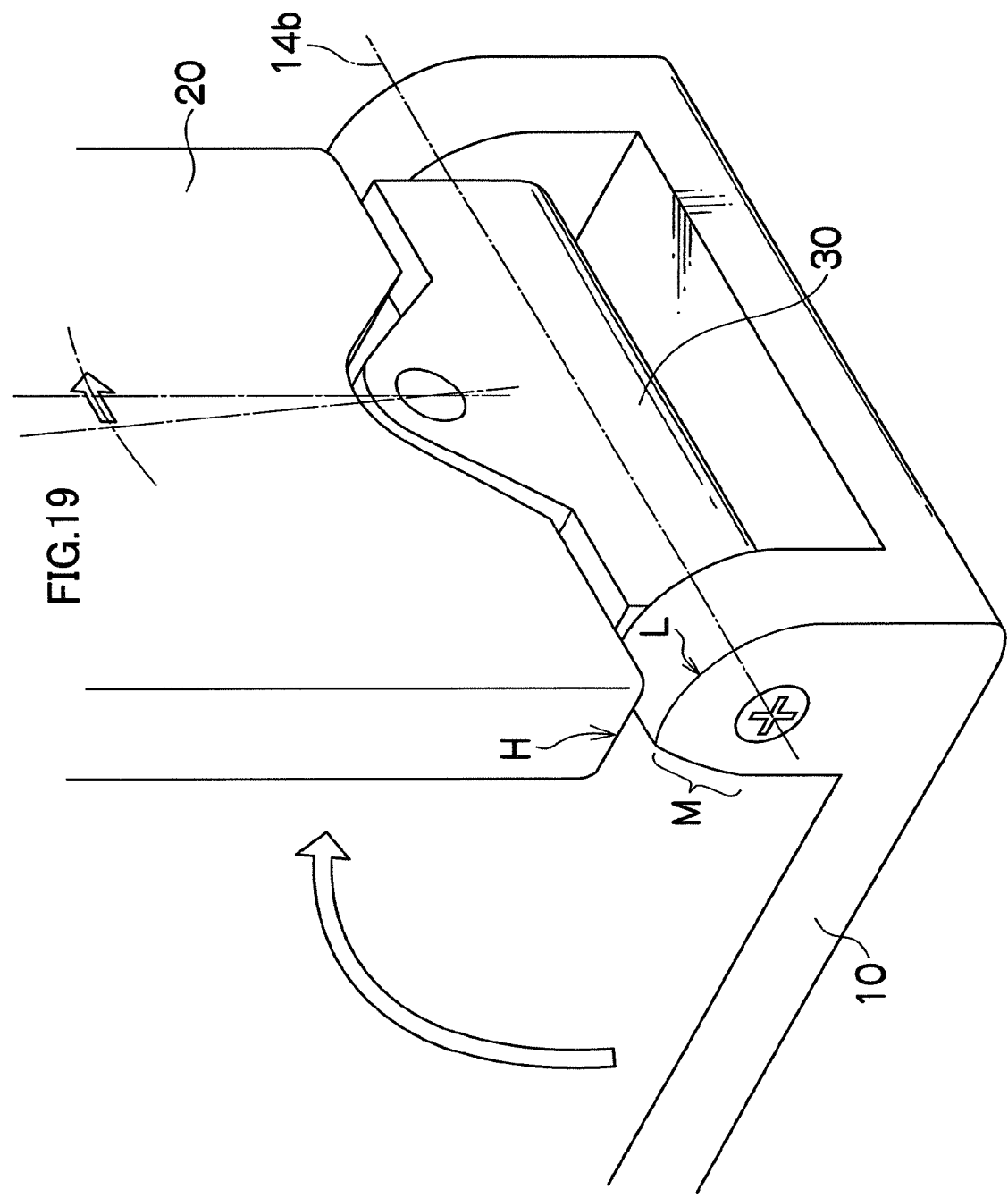

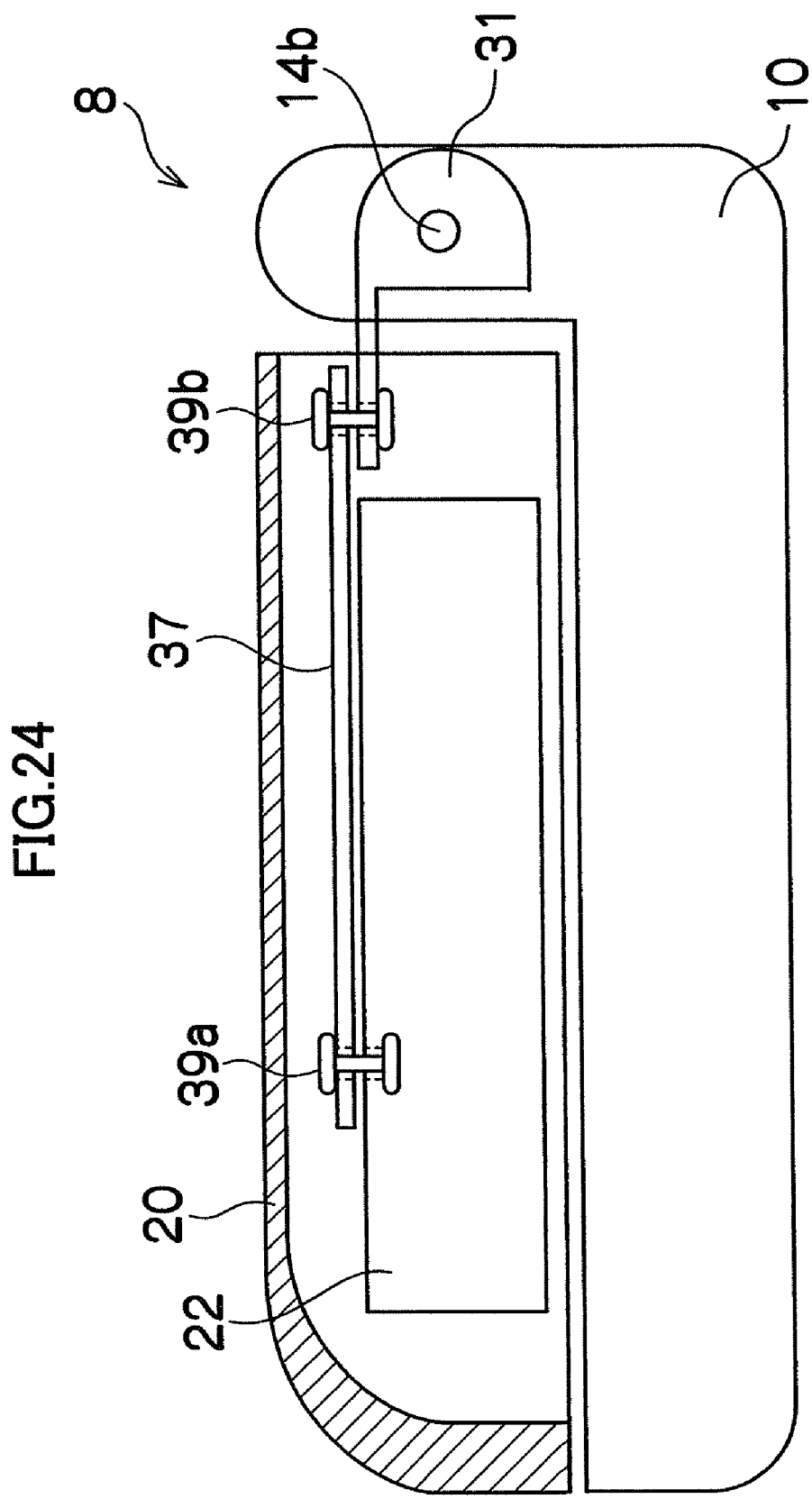

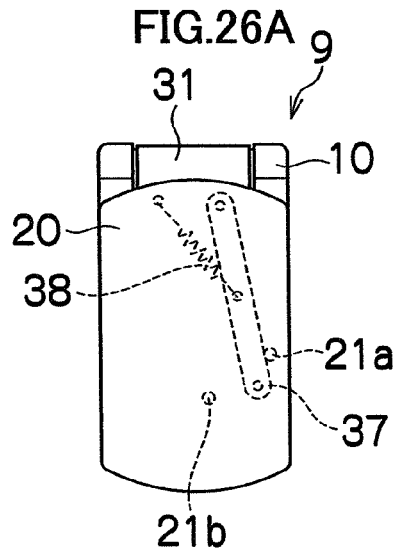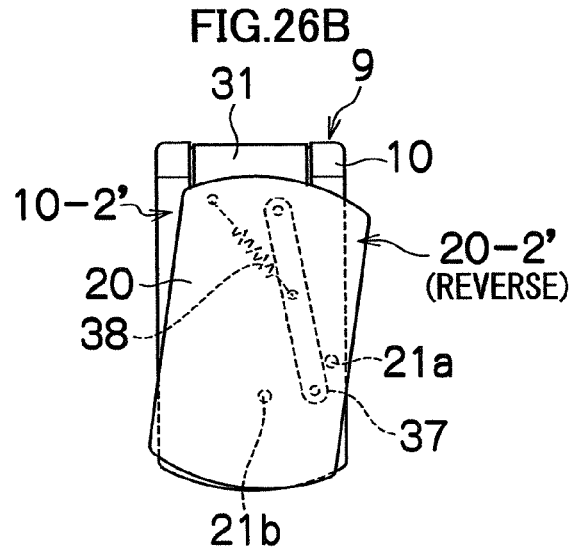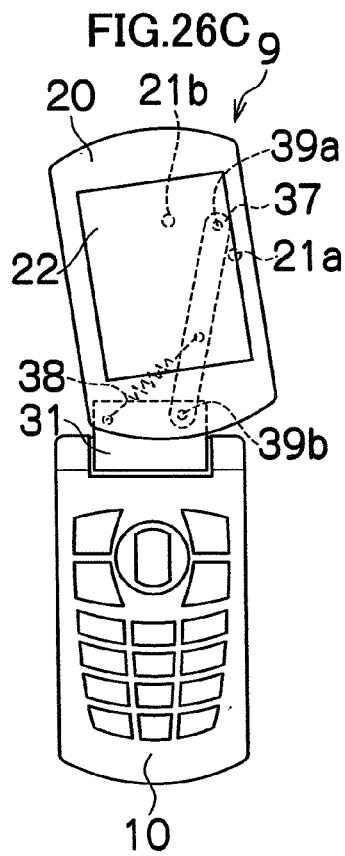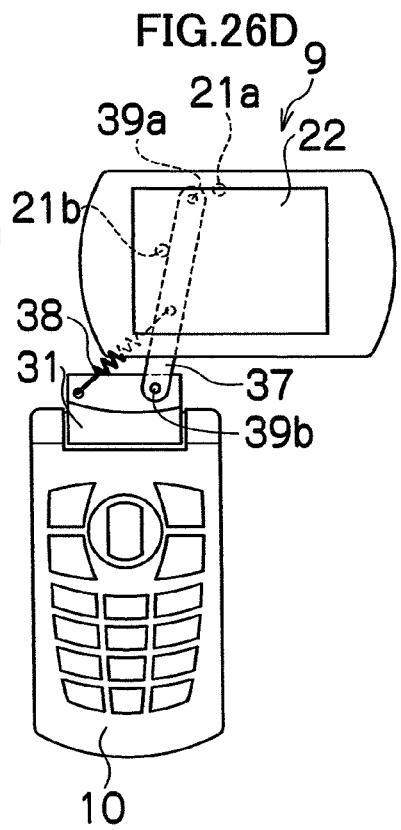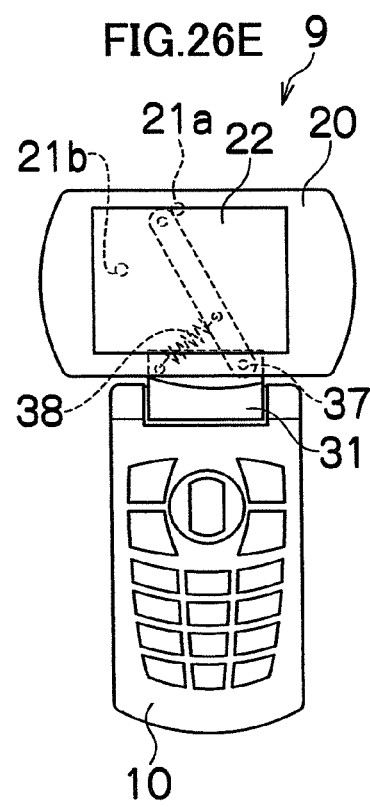

PORTABLE DEVICE

BACKGROUND OF THE INVENTION

1. Field of the Invention

The present invention relates to a portable device, and more particularly to a foldable portable device.

2. Description of the Related Art

There is a foldable portable device constituted of two casings, one having a display unit and the other having an operating unit, which are coupled to each other with a hinge to open and close the casings. The foldable portable device is convenient to be carried in a compact form as it is folded to have the display unit and the operating unit closed to face each other.

When the foldable portable device is in the closed state, if the edges of the two casings coupled with the hinge are placed substantially at the same place, it is then difficult for the user to open the portable device one-handed.

To address this problem, Japanese Patent Application Laid-Open No. 2005-159390 discloses a portable device having the casing formed with a slope near the hinge to enable the user to easily open the portable device one-handed.

Japanese Patent Application Laid-Open No. 2004-215180 discloses a portable device having the casing with the display unit that can be turned with a sliding mechanism. Japanese Patent Application Laid-Open No. 2003-319043 discloses a portable device having the casing to which a display unit is separately attached so that the display unit can be turned. Japanese Patent Application Laid-Open No. 2004-207961 discloses a portable device having the edge of the casing with the display unit bigger than the edge of the casing with the operating unit.

The above-described portable devices in the related art have problems below. The portable device described in Japanese Patent Application Laid-Open No. 2005-159390 is adapted to catch the user's fingers and/or thumb on the closed casings in the direction of opening them. However, the portable device has no means to make the casing with the operating unit to be firmly held on the user's hand, and the portable device is then prone to be dropped in response to the user's force to open the casings one-handed. Moreover, the portable device has an asymmetric receding part on the casing, which makes the appearance of the portable device imbalanced.

The portable devices described in Japanese Patent Application Laid-Open Nos. 2004-215180 and 2003-319043 are adapted to allow the casing with the display unit or the display unit itself to turn to be placed in either vertically or horizontally; however, there are no concepts of facilitating easy opening of the two casings. Therefore, when the casing with the display unit or the display unit itself is turned, the turned casing or the turned display unit cannot catch the user's fingers and/or thumb to open the two casings one-handed.

The portable device described in Japanese Patent Application Laid-Open No. 2004-207961 has the casing with the display unit bigger than the casing with the operating unit for enabling the user to view the display unit in the state where the two casing are closed; however, there are no concepts of facilitating easy opening of the two casings. Therefore, the part of the casing with the display unit protruding from the casing with the operating unit cannot catch the user's fingers and/or thumb to open the two casings one-handed.

SUMMARY OF THE INVENTION

The present invention has been contrived in view of such circumstances, an object thereof being to provide a portable device adapted not only to enable the user to easily open the casings with one hand but also to enable the user to easily open the casings while stably holding the device with one hand according to a concept of enabling the user to move one of the casings while stably holding the other. The portable device is also provided with good operability.

In order to attain the aforementioned object, the present invention is directed to a portable device, comprising: a first casing; a second casing; and a hinge which joins the first and second casings, the first and second casings being capable of turning on the hinge to open and close with respect to each other, wherein when the portable device is in a closed state where the first and second casings close, a first part of the first casing and a first part of the second casing face each other, a second part of the first casing protrudes from behind the second casing, and a second part of the second casing protrudes from behind the first casing, the second parts of the first and second casings being opposite to each other across the first parts of the first and second casings.

According to this aspect of the present invention, the first and second casings are placed so that when the first and second casings are closed, a part of the first casing protrudes from behind the edge of the second casing, while a part of the second casing protrudes from behind the edge of the first casing, with the protruding parts being at the opposite side across the overlapped parts of the first and second casings. That is, the user holds the portable device with one hand by placing the overlapped parts of the first and second casings on the palm with the middle finger, the third finer and the little finger placed on one of the part of the first casing protruding from behind the second casing and the part of the second casing protruding from behind the first casing and the thumb placed on the other part. One of the protruding parts makes a place to catch the user's finger placed on the portable device and the other protruding part makes a place to catch the user's thumb opening the portable device. The user can open the portable device by pushing the latter part with the thumb.

Accordingly, the user can hold the portable device while easily opening the first and second casings with one hand.

It is preferable that the portable device in the closed state is adapted to be held by a user in a properly held state where the second casing is placed over the first casing and the hinge is placed on a far side from the user; and when the portable device in the closed state is held by the user in the properly held state, the second part of the first casing protrudes to a left-hand side and the second part of the second casing protrudes to a right-hand side, seen from the user.

According to this aspect of the present invention, when the portable device is held with the second casing placed over the first casing and the hinge placed at the far side from the user, the part of the first casing protrudes from behind the left-hand side as seen from the user and the part of the second casing protrudes from behind the right-hand side. That is, when the user holds the portable device with the right hand, the user holds the portable device by placing the middle finger, the third finger and the little finger on the protruding part of the first casing and opens the portable device by pushing the protruding part of the second casing with the thumb.

Accordingly, the user can hold the portable device while easily opening the first and second casings with only the right hand.

In order to attain the aforementioned object, the present invention is also directed to a portable device, comprising: a first casing; a second casing; and a hinge which joins the first and second casings, the first and second casings being capable of turning on a turn axis of the hinge to open and close with respect to each other, wherein when the portable device is in an opened state where the first and second casings open, the portable device presents a substantially rectangular appearance, and the turn axis of the hinge is oblique to a line perpendicular to a longitudinal side of the substantially rectangular appearance of the portable device.

According to this aspect of the present invention, the portable device presents a substantially rectangular appearance when the first and second casings are opened and the hinge is provided so that the turn axis of the hinge for coupling the first and second casings is oblique to the direction orthogonal to the long sides of the rectangular shape. That is, as the turn axis of the hinge is oblique to the direction orthogonal to the long sides of the rectangular shape when the first and second casings are in the opened state, the portable device presents the substantially rectangular appearance as the first and second casings are in the opened state. When the first and second casings are closed, a part of the first casing protrudes from behind the edge of the second casing, while a part of the second casing protrudes from behind the edge of the first casing, with the protrudes parts being at the opposite side across the overlapped parts of the first and second casings.

Accordingly, the user can hold the portable device while easily opening the first and second casings with one hand. Moreover, the portable device presents an appearance like a usual portable device when the first and second casings are in the opened state.

It is also preferable that when the portable device is in a closed state where the first and second casings close, the portable device is adapted to be held by a user in a properly held state where the second casing is placed over the first casing and the hinge is placed on a far side from the user; and when the portable device in the closed state is held by the user in the properly held state, the turn axis of the hinge is tilted counterclockwise with respect to the line perpendicular to the longitudinal side of the substantially rectangular appearance of the portable device, seen from the user.

According to this aspect of the present invention, when the portable device is held with the second casing placed over the first casing and the hinge placed at the far side from the user, the portable device presents a substantially rectangular appearance when the first and second casings are in the opened state, and the hinge for coupling the first and second casings is provided so that the turn axis of the hinge is tilted counterclockwise with respect to the direction orthogonal to the long sides of the rectangular shape. That is, as the turn axis of the hinge is tilted counterclockwise with respect to the direction orthogonal to the long sides when the first and second casings are in the opened state, the portable device presents a substantially rectangular appearance when the first and second casings are in the opened state. When the first and second casings are closed with the second casing placed over the first casing and the hinge placed at the far side from the user, a part of the first casing protrudes from behind the left-hand side as seen from the user and a part of the second casing protrudes from behind the right-hand side.

Accordingly, the user can hold the portable device while easily opening the first and second casings with only the right hand. Moreover, the portable device presents an appearance like a usual portable device when the first and second casings are in the opened state.

In order to attain the aforementioned object, the present invention is also directed to a portable device, comprising: a first casing; a second casing; a hinge which joins the first and second casings, the first and second casings being capable of turning on a turn axis of the hinge to open and close with respect to each other, each of the first and second casings having an inside surface coming inside when the portable device is in a closed state where the first and second casings close; and a tilting device which, when the portable device is in the closed state, allows one of the first and second casings to turn to tilt along a plane parallel to the inside surface of the one of the first and second casings with respect to the other of the first and second casings between a nonaligned position and an aligned position, wherein: in the nonaligned position, the one of the first and second casings is tilted in a predetermined direction by a predetermined angle with respect to the other of the first and second casings, a first part of the first casing and a first part of the second casing face each other, a second part of the first casing protrudes from behind the second casing, and a second part of the second casing protrudes from behind the first casing; and in the aligned position, the second part of the first casing does not protrude from behind the second casing, and the second part of the second casing does not protrude from behind the first casing.

According to this aspect of the present invention, one of the closed two casings is tilted along the inside surface of the casing between a place where the two casings are aligned with each other without any part protruding and a place where one of the two casings is tilted in a direction by a predetermined angle. That is, when the second casing is placed over the first casing with the hinge placed at the far side from the user, a lateral pressure given to the portable device shifts the second casing from the first casing.

Accordingly, the user can hold the portable device while easily opening the first and second casings with one hand. The portable device presents an appearance like a usual portable device when the first and second casings are in the closed state. As the direction for the second casing to tilt is limited to one direction, the user can easily tilt the second casing so as to enable the hand more dominant than the other to easily open by giving a light lateral pressure on the portable device.

In order to attain the aforementioned object, the present invention is also directed to a portable device, comprising: a first casing; a second casing; a hinge which joins the first and second casings, the first and second casings being capable of turning on a turn axis of the hinge to open and close with respect to each other, each of the first and second casings having an inside surface coming inside when the portable device is in a closed state where the first and second casings close; and a tilting device including an elastic member which, when the portable device is in the closed state, allows one of the first and second casings to tilt along a plane parallel to the inside surface of the one of the first and second casings with respect to the other of the first and second casings between a nonaligned position and an aligned position, wherein: in the nonaligned position, the one of the first and second casings is tilted by a predetermined angle with respect to the other of the first and second casings, a first part of the first casing and a first part of the second casing face each other, a second part of the first casing protrudes from behind the second casing, and a second part of the second casing protrudes from behind the first casing; and in the aligned position, the second part of the first casing does not protrude from behind the second casing, and the second part of the second casing does not protrude from behind the first casing.

According to this aspect of the present invention, one of the closed two casings is tilted through the elastic member along the inside surface of the casing between a place where the two casings are aligned with each other without any part protruding and a place where one of the two casings is tilted by a predetermined angle.

Accordingly, the portable device with simple configuration enables the user to hold the first and second casings while easily opening the portable device with one hand. The portable device presents an appearance like a usual portable device when the first and second casings are in the closed state.

It is also preferable that the portable device further comprises a click device which is adapted to keep the one of the first and second casings in each of the nonaligned position and the aligned position.

According to this aspect of the present invention, the tilt of one of the two casings is kept at each of a place where the two casings are aligned to each other without any part protruding and a place where one of the two casings is tilted by a predetermined angle. That is, when the lateral pressure is given to the portable device held with the second casing placed over the first casing and the hinge placed at the far side from the user, the second casing is tilted with respect to the first casing. The second casing can be kept at the place.

Accordingly, the user can hold the portable device while easily opening the first and second casings with one hand.

It is also preferable that the portable device further comprises a tilt regulating device which is adapted to regulate tilt of the one of the first and second casings so that the portable device presents a substantially rectangular appearance when the portable device is in an opened state where the first and second casings open.

According to this aspect of the present invention, the tilt is regulated so that the opened two casings present a substantially rectangular appearance even if the closed two casings present another appearance. That is, when the second casing is opened in the state where the portable device is held with the second casing placed over the first casing, the hinge placed at the far side from the user and the second casing is tilted with respect to the first casing, the first and second casings are arranged in a straight line.

Accordingly, the user can hold the portable device while easily opening the first and second casings with one hand. The portable device has better operability as it can be easily handled.

It is also preferable that when the portable device is in an opened state where the first and second casings open, the portable device presents a substantially rectangular appearance, and the turn axis of the hinge is oblique to a line perpendicular to a longitudinal side of the substantially rectangular appearance of the portable device.

According to this aspect of the present invention, one of the closed two casings is tilted along the surface of the casing between the place where the two casings are aligned with each other without any part protruding and a place where one of the two casings is tilted in a direction by a predetermined angle, and the turn axis for opening and closing the two casings is oblique with respect to the direction orthogonal to the long sides of the substantially rectangular shape so that the opened first and second casings present a substantially rectangular appearance. That is, when the lateral pressure is given to the portable device held with the second casing placed over the first casing and the hinge placed at the far side from the user, the second casing is tilted from the first casing. When the first and second casings are opened from this state, the opened first and second casings present a substantially rectangular appearance as the turn axis of the hinge is oblique with respect to the direction orthogonal to the long sides when the first and second casings are in the opened state.

Accordingly, the user can hold the portable device while easily opening the first and second casings with one hand. The portable device presents an appearance like a usual portable device when the first and second casings are in the closed state.

In order to attain the aforementioned object, the present invention is also directed to a portable device, comprising: a first casing; a second casing which has a display; a hinge which joins the first and second casings, the first and second casings being capable of turning on a turn axis of the hinge to open and close with respect to each other; a tilting device which allows the second casing to turn to tilt along a plane parallel to the display with respect to the first casing; and a click device which is adapted to keep the second casing tilting with the tilting device in each of a first position where the display is set to be used with a longer side at a top, a second position where the display is set to be used with a shorter side at the top, and a third position between the first position and the second position, wherein the first and second casings are capable of turning to open and close with respect to each other when the second casing is kept in the third position.

According to this aspect of the present invention, the second casing with the display unit is tilted between the first position to set the display to be used with the shorter side at the top and the second position to set the display to be used with the longer side at the top. The second casing can be kept at each of the first position, the second position and the third position, which is placed between the first position and the second position, and the second casing can be opened and closed when the second casing is at the third position. That is, the parts for catching the user's fingers and thumb to open the two casings can be prepared by using a mechanism for changing the orientation of the display.

Accordingly, the portable device can enable the user to hold the portable device while easily opening the first and second casings with one hand without being provided with a new mechanism.

It is also preferable that the tilting device is placed adjacent to the turn axis of the hinge.

It is also preferable that the portable device further comprises: a detecting device which detects at least one of acts that the first and second casings turn to open with respect to each other, the first and second casings turn to close with respect to each other, and one of the first and second casings turns to tilt with respect to the other of the first and second casings by a predetermined angle; and a controlling device which controls an operation of the portable device according to the act detected through the detecting device.

According to this aspect of the present invention, whether the casings are tilted or opened or closed is detected, and the portable device is controlled according to the detected result. That is, the portable device detects the act that the user opens or closes or moves the portable device, and automatically operates in various modes according to the detected motion.

Accordingly, the portable device enables easier operation for better operability.

According to the present invention, the portable device for enabling the user to hold the portable device while easily opening and closing the portable device in one hand with good operability can be provided.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 7 is an illustration of a click mechanism in the second casing of the portable device;

FIG. 8 is an illustration of the click mechanism in the portable device;

FIG. 9 is an illustration of the click mechanism in the portable device;

FIGS. 10A and 10B are illustrations of a handling method of the portable device;

FIGS. 11A and 11B are illustrations of another handling method of the portable device;

FIG. 19 is an oblique view of the portable device in the fourth embodiment;

FIG. 24 is a cross-sectional diagram of the portable device in the seventh embodiment;

FIGS. 26A to 26E are external views of the portable device in the seventh embodiment.

DETAILED DESCRIPTION OF THE PREFERRED EMBODIMENTS

First Embodiment

Figure 1B:
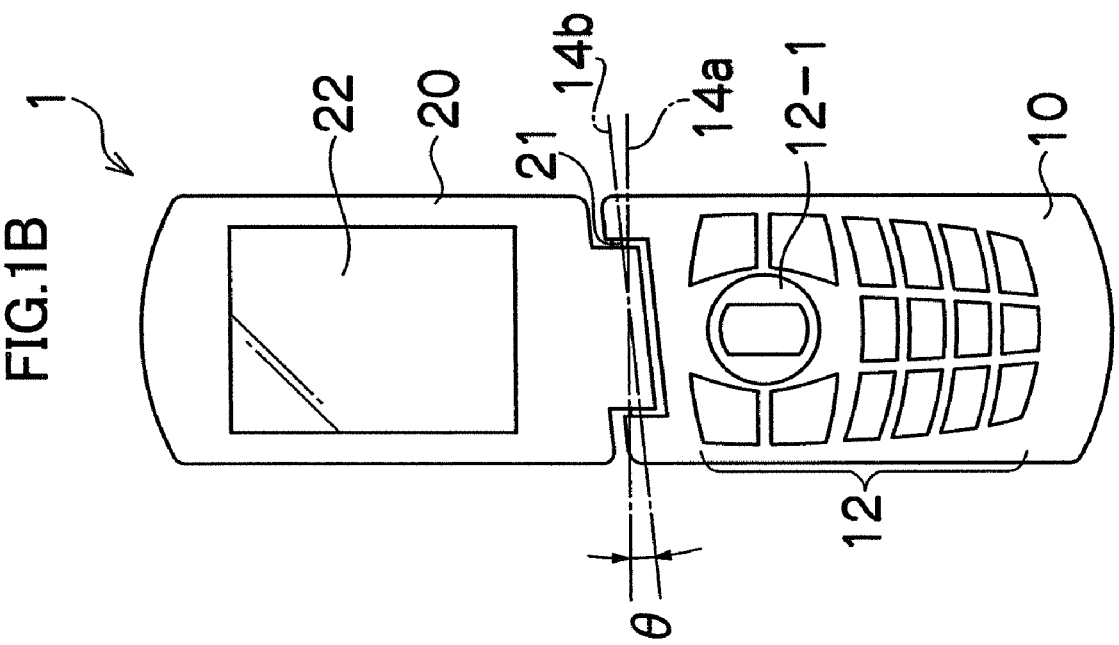
FIGS. 1A and 1B are external views of a portable device according to a first embodiment of the present invention.
Figure 1A:
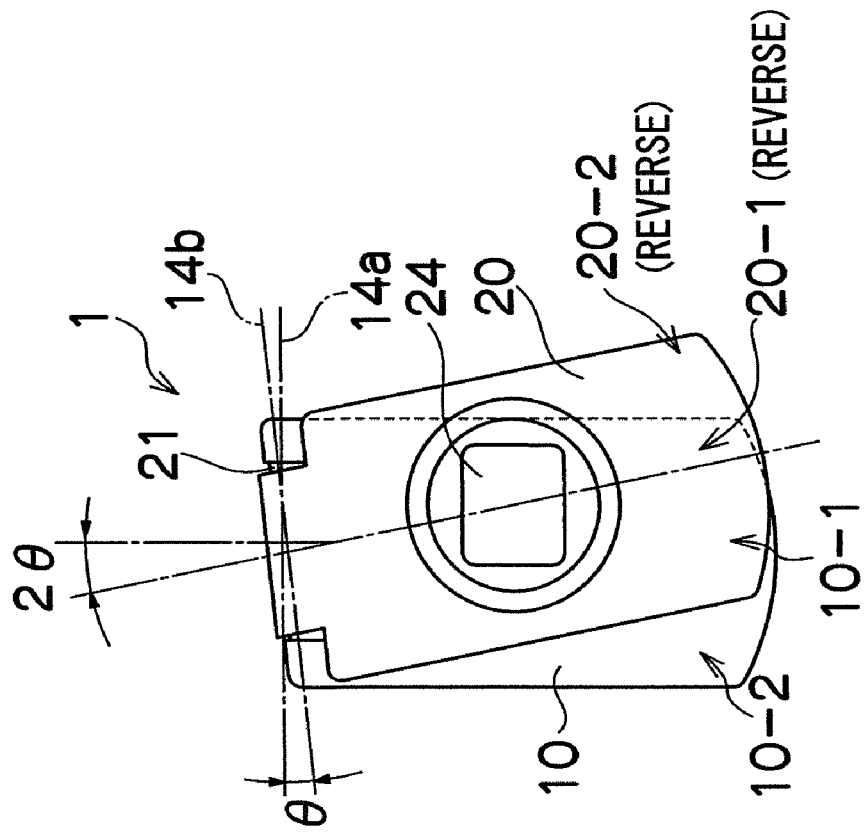

FIGS. 1A and 1B show appearances of a portable device 1 according to a first embodiment of the present invention, in which FIG. 1A shows a closed state and FIG. 1B shows an opened state.

The portable device 1 is a foldable portable device such as a mobile phone. The portable device 1 includes: a first casing 10, which is provided with an operating part 12 having dial keys and the like; a second casing 20, which is provided with a main display 22 and an outside display 24 for displaying information including pictures and the like; and a hinge 21, which joins the first casing 10 and the second casing 20 together.

Figure 2:
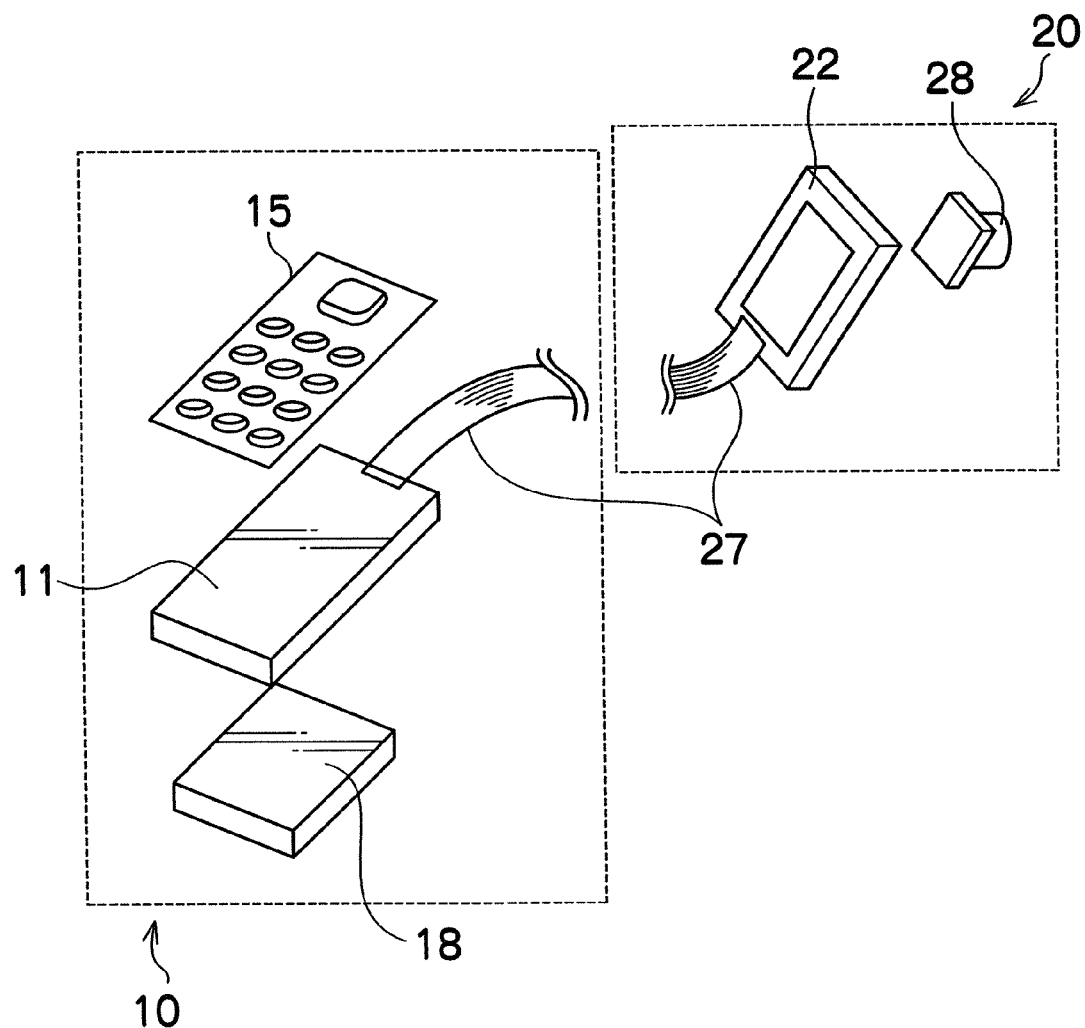
FIG. 2 is a schematic diagram showing an inner configuration of the portable device.

The first casing 10 has a substantially rectangular parallelepiped shape. The operating part 12 having the dial keys and the like, and a microphone 13 (see FIG. 3) are arranged on an inside surface of the first casing 10 which surface comes inside when the portable device 1 is folded. As shown in FIG. 2, the first casing 10 contains a main circuit board 11, on which a central processing unit (CPU) 40 (see FIG. 3) and the like for processing signals inputted through the operating part 12 and the like are arranged, a switch circuit board 15, on which the operating part 12 and the like are arranged, a battery 18, and the like.

The second casing 20 has a substantially rectangular parallelepiped shape similar to the first casing 10. The main display 22 has a rectangular shape of a predetermined aspect ratio, and is arranged on an inside surface of the second casing 20 which surface comes inside when the portable device 1 is folded, in such a manner that the main display 22 is mainly used with the shorter side at the top. The outside display 24 is arranged on the surface of the second casing 20 which surface comes outside when the portable device 1 is folded. The outside display 24 is oblique with respect to the outside surface of the second casing 20 so that the outside display 24 appears straight when the user naturally holds the portable device 1 in the closed state where the first and second casings 10 and 20 close. As shown in FIG. 2, the second casing 20 contains a camera 28, a flashlight 64 (see FIG. 3), and the like.

The main circuit board 11 and the displays 22 and 24 are electrically connected through a flexible printed circuit board 27, which passes inside the hinge 21.

The hinge 21 joins the first casing 10 and the second casing 20, which are capable of turning on a turn axis 14b of the hinge 21 to open and close with respect to each other. As shown in FIG. 1A, when the portable device 1 is in the folded state, the first casing 10 and the second casing 20 overlap in nonalignment with each other; more specifically, a part 10-1 of the first casing 10 and a part 20-1 of the second casing 20 face each other, while a part 10-2 of the left-hand side of the first casing 10 protrudes from behind the second casing 20, a part 20-2 of the right-hand side of the second casing 20 protrudes from behind the first casing 10. The protruding parts 10-2 and 20-2 of the first and second casings 10 and 20 are opposite to each other across the facing parts 10-1 and 20-1 of the first and second casings 10 and 20. On the other hand, as shown in FIG. 1B, when the portable device 1 is in the opened state where the first casing 10 and the second casing 20 open, the first casing 10 and the second casing 20 are aligned with each other, and the portable device 1 presents a substantially rectangular appearance as a whole.

The turn axis 14b of the hinge 21 for folding and opening the portable device 1 is tilted counterclockwise in FIGS. 1A and 1B by θ with respect to a line 14a perpendicular to the longitudinal side of the substantially rectangular appearance of the portable device 1 in the opened state.

Hence, the portable device 1 presents the substantially rectangular appearance in the opened state as shown in FIG. 1B, while the portable device 1 appears with the first casing 10 and the second casing 20 nonaligned by 20 in the folded state as shown in FIG. 1A.

Figure 3:
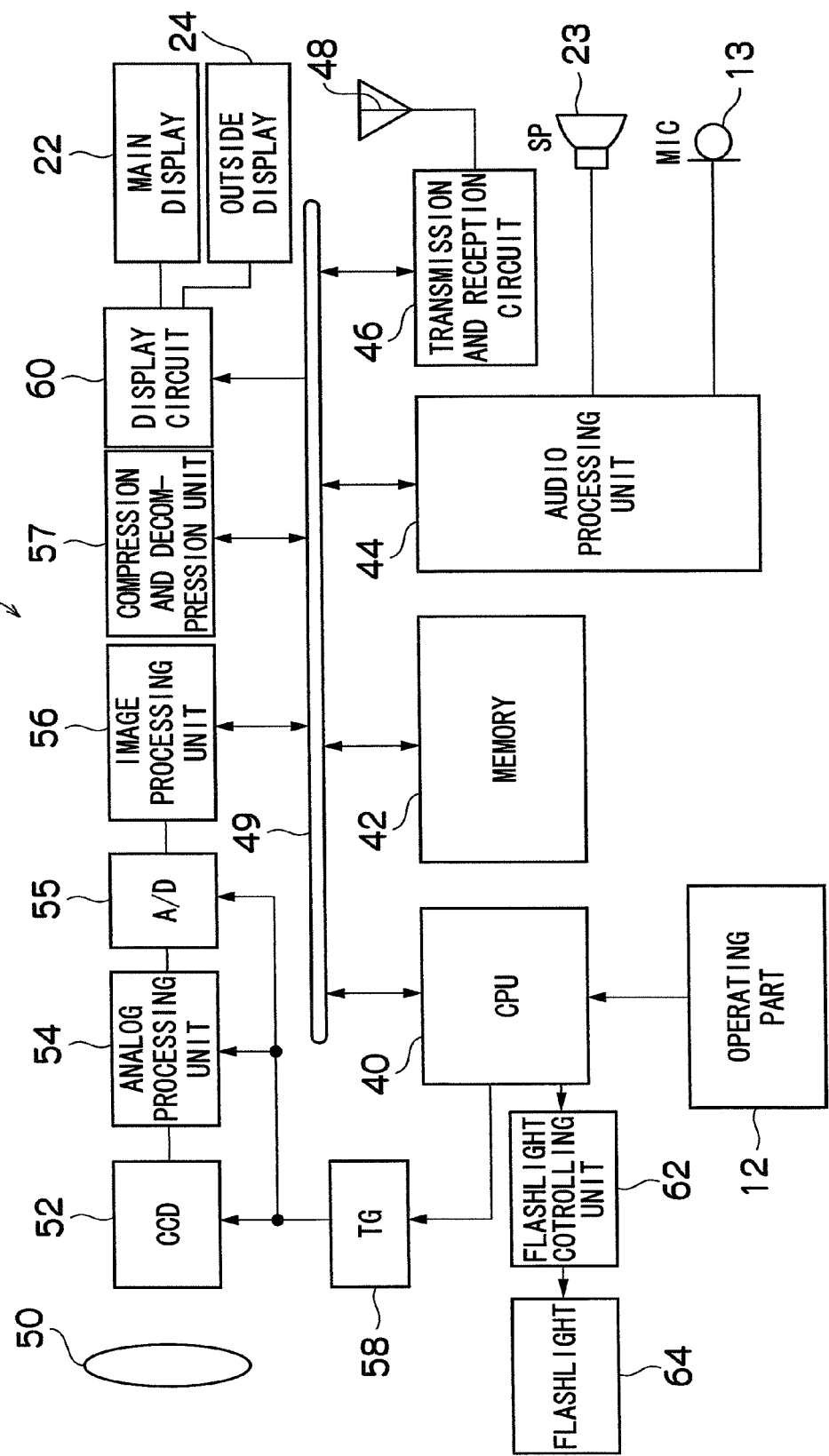
FIG. 3 is a block diagram showing an inner configuration of the portable device.

FIG. 3 is a block diagram showing the system configuration of the portable device 1.

As shown in FIG. 3, the portable device 1 includes the CPU 40, a memory 42, an audio processing unit 44, a transmission and reception circuit 46 and the like in addition to the operating part 12 and the display 22 shown in FIG. 1B, and has a function for receiving television broadcast and a function for transmitting and receiving e-mails together with a general telephone function.

The CPU 40 serves as a controller which controls entire operations of the portable device 1 according to a predetermined program, and also serves as an arithmetic device which carries out various kinds of arithmetic operations. That is, the CPU 40 controls each circuit inside the portable device 1 in accordance with command signals inputted through the operating part 12 to carry out communication control, image pickup operation control, image processing control, display control of the displays 22 and 24, read and write control of the memory 42, management of an address book and the like.

The memory 42 is connected to the CPU 40 through a bus 49 and is a block including a non-volatile memory (ROM) region where the program which the CPU 40 executes and various kinds of data required for control are stored, a spreading region of the program, and a volatile memory (RAM) region utilized as a region for arithmetic operations for the CPU 40. The ROM region is utilized as the address book and a data storage region of call history and is utilized as a retaining region of audio and images. The RAM region is utilized as a temporary storage region of image data as well.

The audio processing unit 44 is a device which brings the audio signals into process and conversion in association with the CPU 40. The audio process unit 44 carries out a decoding process of data received through the transmission and reception circuit 46, a coding process of data to be transmitted through the transmission and reception circuit 46, a coding process of audio signal inputted from the microphone 13, a generation process of signal outputted to a speaker 23, and the like.

The transmission and reception circuit 46 converts signal form of data received by an antenna 48 and data to be transmitted from the antenna 48.

In the call mode (mode for use of the telephone functions), when communication connection with a call counter party for a call is established, the sound inputted to the microphone 13 is converted into an electric signal, which is transmitted to the audio processing unit 44. The audio processing unit 44 converts the audio signal inputted from the microphone 13 into a digital signal (A/D conversion), which thereafter undergoes the required signal process and is converted into audio data of a predetermined form. The audio data (data for transmission) having undergone the process in the audio processing unit 44 are transmitted to the transmission and reception circuit 46 through the bus 49 and are converted into a predetermined signal form for transmission and thereafter transmitted from the antenna 48.

The signal received by the antenna 48 is demodulated in the transmission and reception circuit 46 and is transmitted to the audio processing unit 44. The audio processing unit 44 converts the audio signal received from the transmission and reception circuit 46 into audio data of a predetermined form. The audio data (reception data) generated in the audio processing unit 44 are converted into an analog audio signal (D/A conversion), which is transmitted to the speaker 23. Thus, the sound of the call counter party is audibly outputted from the speaker 23.

In the television mode, when the antenna 48 receives radio waves of the television broadcast, the received signal of the television broadcast is divided into an audio signal and a video signal in the transmission and reception circuit 46.

The audio signal is inputted to the audio processing unit 44 and outputted from the speaker 23.

On the other hand, the video signal is converted into a digital signal in the transmission and reception circuit 46 and is outputted to the display 22 through a display circuit 60. Thus, the televised video is displayed on the display 22.

The channel selection on the television in the transmission and reception circuit 46 is carried out through the left and right keys of a cross button 12-1. That is, every push on the right key sends the channel forward one after another. Every push on the left key sends the channel backward one after another.

The television audio volume is controlled by the upper and lower keys of the cross button 12-1. Every push on the upper key makes the audio volume louder stepwise and every push on the lower key makes the audio volume weaker stepwise.

The portable device 1 can transmit and receive various kinds of data such as image data, document data, program data and the like in utilization of e-mail functions, browser functions of the Internet and the like.

The portable device 1 includes the camera 28 having an image taking lens 50 and a CCD image sensor (hereinafter referred to as CCD) 52, and further includes an analog processing unit 54, an A/D converter 55, an image processing unit 56 and a compression and decompression unit 57, which process the image signal obtained from the CCD 52. The portable device 1 has a flashlight controlling unit 62 and the flashlight 64 for illuminating the subjects, of which image is captured through the CCD 52, according to the conditions.

The light having passed the image taking lens 50 focuses on a light receiving plane of the CCD 52. On the light receiving plane of the CCD 52, a great number of photosensors (light receiving elements) are arrayed two-dimensionally. Corresponding with the respective photosensors, elementary color filters of red (R), green (G) and blue (B) are arranged in a predetermined array structure.

A subject image formed on the light receiving plane of the CCD 52 is converted by the photosensors into signal charges in quantities corresponding with the incident light amounts. The CCD 52 has an electronic shutter function, which controls a charge accumulating duration (shutter speed) of the photosensors with timing of shutter pulses.

The signal charges accumulated in the photosensors of the CCD 52 are sequentially read as voltage signals (image signals) corresponding with the signal charges in accordance with pulses (horizontal drive pulses φH, vertical drive pulses φV and overflow drain pulses) applied from a timing generator (TG) 58 according to commands of the CPU 40. The image signals outputted from the CCD 52 are transmitted to the analog processing unit 54 to undergo a required process such as a correlation double sampling (CDS) process and gain adjustment and thereafter are converted to a digital signal by the A/D converter 55. The digitalized image data is transmitted to the image processing unit 56.

The image processing unit 56 is a digital image signal processing unit including a synchronization circuit (a processing circuit which calculates color of each point by interpolating special displacements of color signals accompanied by color filter array of the single plate CCD), a luminance and color difference signal generation circuit, a gamma conversion circuit, a contour correction circuit, a white balance adjustment circuit and the like, and processes the image signals using the memory 42 according to commands of the CPU 40.

In the image processing unit 56, the image data that are generated after undergoing the predetermined processes such as the white balance adjustment process, the gamma conversion process, and the conversion process (YC process) to the luminance signal (Y signal) and the color difference signals (Cr, Cb signals) are temporarily stored in the memory 42. Here, in the case where the image is displayed on the display 22 while the image is being captured, the contents of the memory 42 are read and transmitted to the display circuit 60 and converted into the signal for display in the display circuit 60, which signal is applied to the display 22. Thereby, the live image (through image) being captured by the CCD 52 is displayed on the display 22. The user can confirm the image capturing angle (composition) with the video image displayed on the display 22.

The flashlight controlling unit 62 controls charging and light emission of the flashlight 64 according to commands of the CPU 40.

When an image capturing button on the operating part 12 (for example, any of the keys on the operating part 12 allocated at the image capturing mode, or a dedicated image capturing button) is pressed, the CPU 40 detects the fact and executes the image capturing operation. That is, the exposure control and the charge reading control for the CCD 52 is performed. If the brightness of the subject requires light emission of the flashlight 64 at that moment, the CPU 40 causes the flashlight 64 to emit light through the flashlight controlling unit 62.

The image data thus captured are undergone the YC processing and the other predetermined signal processing in the image processing unit 56, then transmitted to the compressing and decompressing unit 57, and compressed according to a predetermined compression format (for example, JPEG format). The compressed image data are stored in the image storage region in the memory 42.

At an occasion of reproducing the stored image, the data of the image file are read from the memory 42 in accordance with the file selection operation of the user and otherwise automatically. The compressed data read from the memory 42 are decompressed by the compressing and decompressing unit 57, and converted into the signal for displaying by the display circuit 60, which signal is applied to the display 22. Thereby, the image contents of the relevant file are displayed on the display 22. Similarly, at an occasion of displaying information on the outside display 24, the data of an image to be displayed are converted into the signal for displaying by the display circuit 60, which signal is applied to the outside display 24.

Now, a method for handling the portable device 1 when the user holds the portable device 1 in the right hand is described.

Figure 4A:
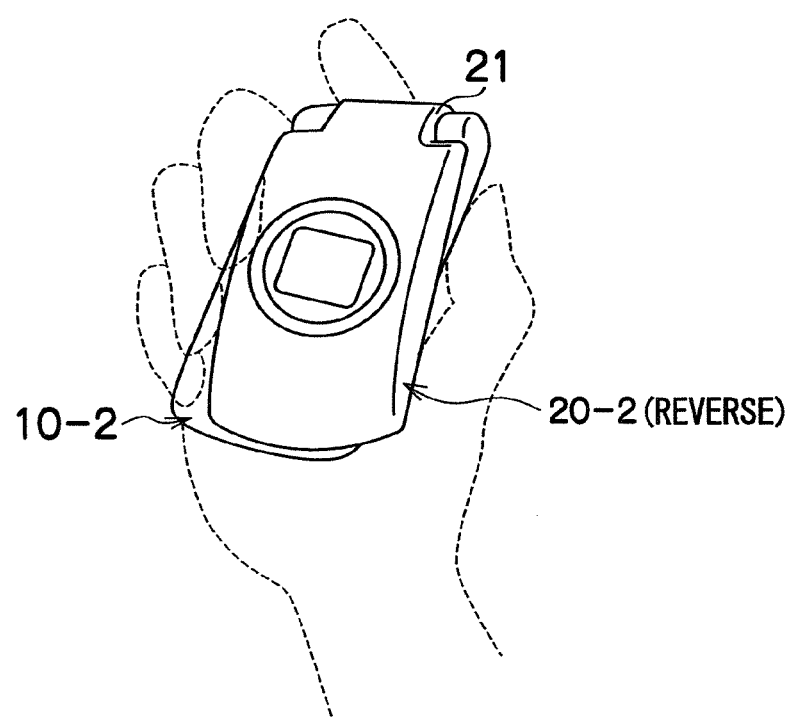
FIGS. 4A and 4B are illustrations of a handling method of the portable device.

The portable device 1 in the closed state is adapted to be held by the user in a properly held state where the second casing 20 is placed over the first casing 10 and the hinge 21 is placed on the far side from the user as shown in FIG. 4A. When the user holds the closed portable device 1 in the properly held state in the right hand and intends to open the portable device 1 one-handed (i.e., with only the right hand), the user can hold the protruding part 10-2 of the first casing 10 with the middle finger, the third finger and the little finger as shown in FIG. 4A while setting the thumb on the protruding part 20-2 of the second casing 20 to press the protruding part 20-2 to open the portable device 1. Thus, the user can stably hold the portable device 1 in the palm with the fingers while naturally opening the portable device 1 with the thumb.

Figure 4B:
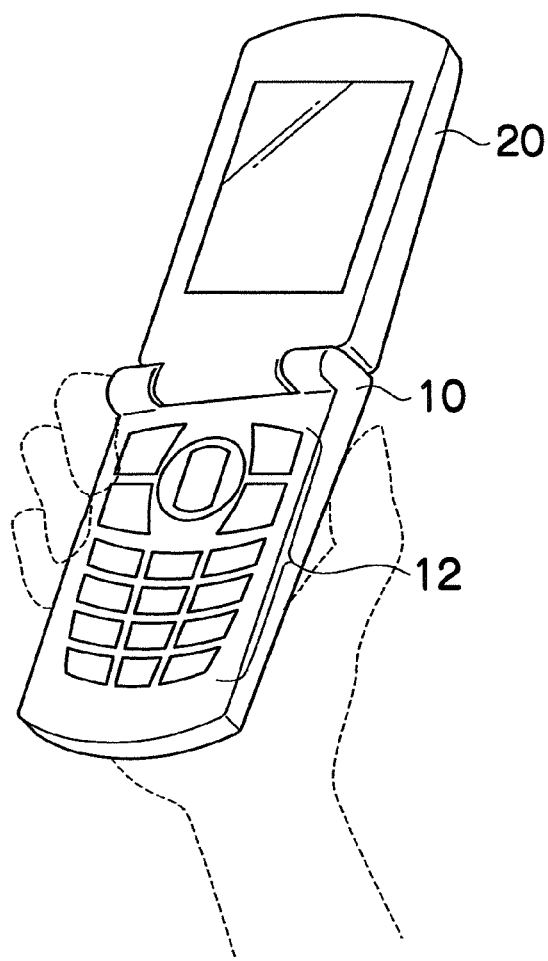

When the portable device 1 is in the opened state, the first casing 10 and the second casing 20 are aligned with each other as shown in FIG. 4B. Accordingly, the user can naturally use the portable device 1.

According to the first embodiment of the present invention, the portable device enables the user to stably hold the portable device while easily opening the first and second casings with only the right hand as the user holds the portable device by keeping the middle finger, the third finger and the little finger on the protruding part 10-2 while opening the portable device by pressing the protruding part 20-2 with the thumb. The user has little chance of dropping the portable device when opening the portable device, since the user can stably hold the portable device by keeping the protruding part 10-2 with the middle finger, the third finger and the little finger.

In the first embodiment, since the portable device has the axis of the hinge that is tilted, the portable device has the protruding parts 10-2 and 20-2 to catch the user's fingers and thumb when the first and second casings are in the closed state, while the portable device presents the appearance with no protrusions like a usual portable device when the first and second casings are in the opened state.

The portable device described in the first embodiment has the axis of the hinge tilted counterclockwise in FIGS. 1A and 1B with respect to the line perpendicular to the longitudinal side of the substantially rectangular appearance of the portable device 1 in the opened state, so that the part 10-2 of the left-hand side of the first casing 10 and the part 20-2 of the right-hand side of the second casing 20 protrude from the facing parts 10-1 and 20-1 of the first and second casings 10 and 20 in the closed state, in order to allow the user to hold the portable device while easily handling the portable device with only the right hand. Alternatively, in order to allow the user to hold the portable device while easily handling the portable device with only the left hand, it is also possible that the portable device has the axis of the hinge tilted clockwise with respect to the line perpendicular to the longitudinal side of the substantially rectangular appearance of the portable device 1 in the opened state, so that a part of the right-hand side of the first casing 10 and a part of the left-hand side of the second casing 20 protrude from the facing parts of the first and second casings 10 and 20 in the closed state.

Second Embodiment

The portable device in the first embodiment of the present invention is provided with the oblique hinge to make the parts 10-2 and 20-2 to catch the user's fingers and thumb protrude from behind the first and second casings 10 and 20 when the portable device is in the folded state; however, the arrangement of the hinge is not limited to that, and it is also possible that the portable device is adapted to prepare the protruding parts to catch the user's fingers and thumb without requiring the hinge to be oblique.

Figure 5A:
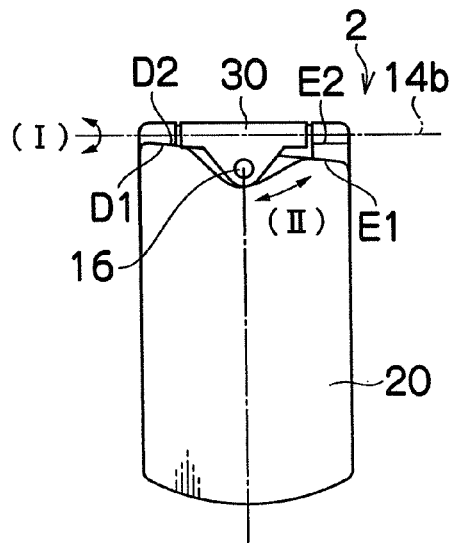
FIGS. 5A to 5D are external views of a portable device according to a second embodiment of the present invention.
Figure 5B:
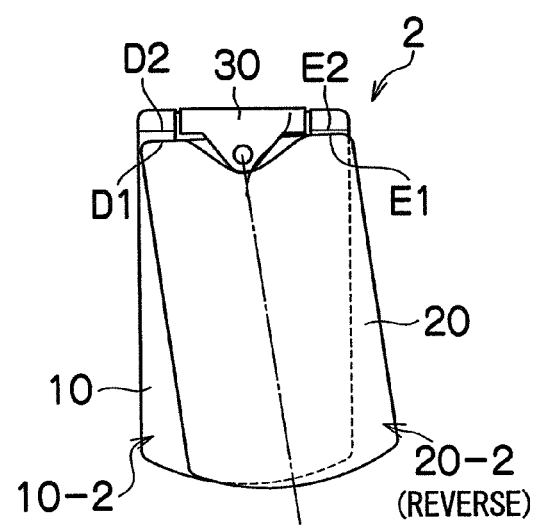
Figure 5C:
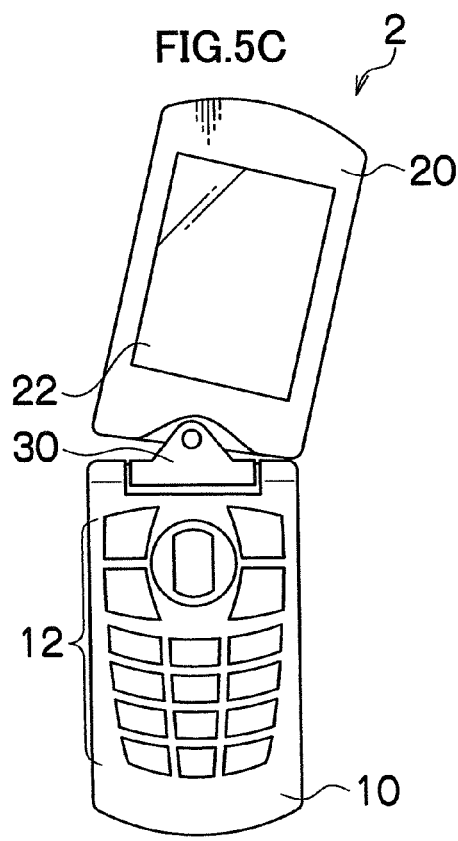
Figure 5D:
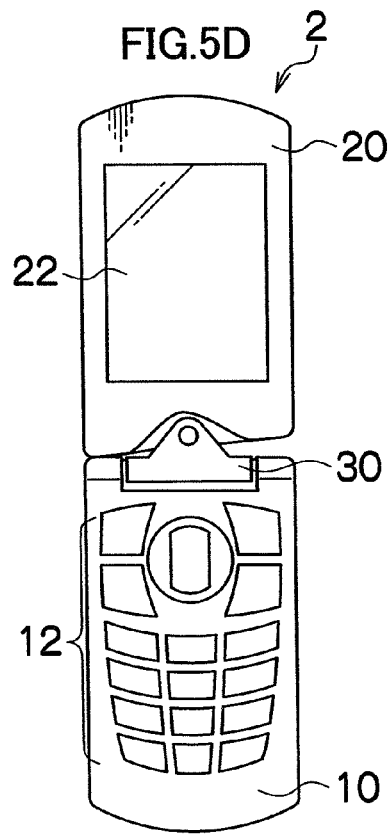

The portable device according to the second embodiment of the present invention prepares the protruding parts 10-2 and 20-2 to catch the user's fingers and thumb by allowing the first and second casings 10 and 20 to turn in the directions different from the directions for opening and folding the portable device. FIGS. 5A to 5D show appearances of a portable device 2 according to the second embodiment, in which FIG. 5A shows the portable device 2 in the closed state, FIG. 5B shows a state where the second casing 20 of the portable device 2 has been turned to tilt with respect to the first casing 10 in the closed state, FIG. 5C shows a state where the portable device 2 has been just opened, and FIG. 5D shows the portable device 2 ready for use. The same parts as those in the first embodiment are denoted with the same reference numerals in the drawings, and are not described here.

The portable device 2 is foldable, and includes: the first casing 10, which is provided with the operating part 12 having the dial keys and the like; the second casing 20, which is provided with the display 22 for displaying information including pictures and the like; and a hinge 30, which joins the first casing 10 and the second casing 20 together.

The first casing 10 and the second casing 20 are joined through the hinge 30 with two kinds of freedom: (I) freedom in the opening and closing directions and (II) freedom in the tilting directions. More specifically, the freedom (I) allows one of the first and second casings 10 and 20 to turn to open and close with respect to the other of the first and second casings 10 and 20, and the freedom (II) allows one of the first and second casings 10 and 20 to turn to tilt along the plane parallel to the inside surface of the one of the first and second casings 10 and 20 with respect to the other of the first and second casings 10 and 20.

When the portable device 2 is carried (i.e., when the portable device 2 is in the closed state), the portable device 2 can be carried in a compact state. More specifically, as shown in FIG. 5A, the first and second casings 10 and 20 are aligned with each other so that the part 10-2 of the first casing 10 does not protrude from behind the second casing 20 and the part 20-2 of the second casing 20 does not protrude from behind the first casing 10. When lateral pressure is applied to the portable device 2 in the closed state, the second casing 20 is turned on a tilt axis 16 along the plane parallel to the inside surface of the second casing 20 with respect to the first casing 10, and the second casing 20 is thereby slidingly tilted along the plane counterclockwise in FIG. 5A with respect to the first casing 10, so that the parts 10-2 and 20-2 to catch the user's fingers and thumb are made to protrude as shown in FIG. 5B. In this state, the user holds the protruding part 10-2 with the fingers while pushing up the protruding part 20-2 with the thumb, so that the user can stably hold the portable device 2 while easily opening the portable device 2, resulting in the state shown in FIG. 5C. Then, the second casing 20 is returned from the tilted state to the straight state, and the portable device 2 presents the appearance shown in FIG. 5D to be ready for use.

A method for protruding the parts 10-2 and 20-2 to catch the user's fingers and thumb in the case where the lateral pressure is applied to the portable device 2 is described.

In FIG. 5A, tilt regulating parts D1 and D2 abut against each other, and the second casing 20 is thereby prevented from turning to tilt clockwise with respect to the first casing 10; on the other hand, there is a certain space between tilt regulating parts E1 and E2, and the second casing 20 is thereby allowed to turn to tilt counterclockwise with respect to the first casing 10 until the tilt regulating parts E1 and E2 abut against each other. Hence, the second casing 20 is naturally turned to tilt counterclockwise, which is the direction the second casing 20 is not prevented from turning to tilt by the tilt regulating parts, only with an appropriate lateral pressure. Thus, the second casing 20 changes into the state shown in FIG. 5B.

If the portable device is only adapted to allow the second casing 20 to turn to tilt counterclockwise, the second casing 20 easily returns to the original straight state overcoming the force applied to the second casing 20 to open. Such an incidence can be avoided, since the portable device 2 is provided with a click mechanism to keep the second casing 20 in each of the positions in the tilting direction shown FIGS. 5A and 5B.

The click mechanism is described with reference to FIGS. 6A to 9.

Figure 6A:
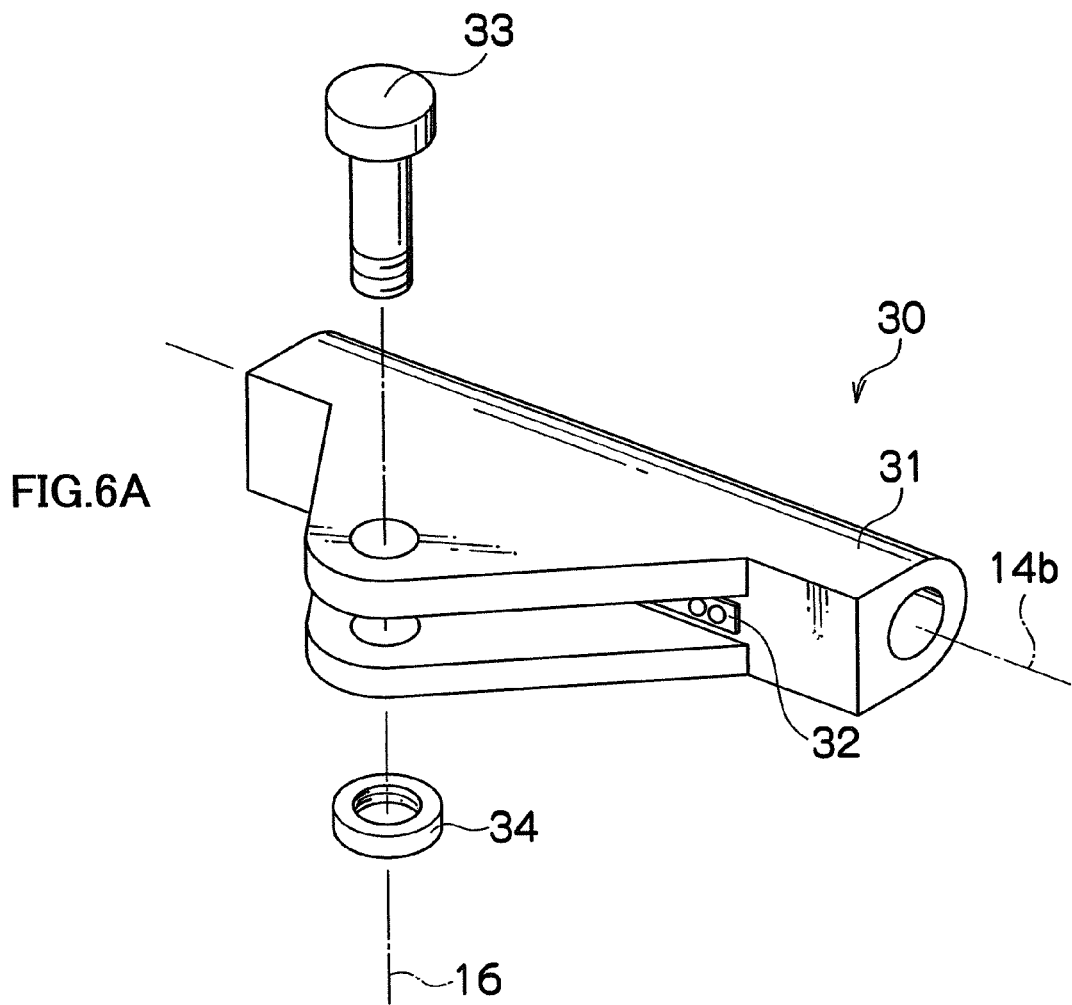
FIGS. 6A and 6B are illustrations of a hinge of the portable device.
Figure 6B:
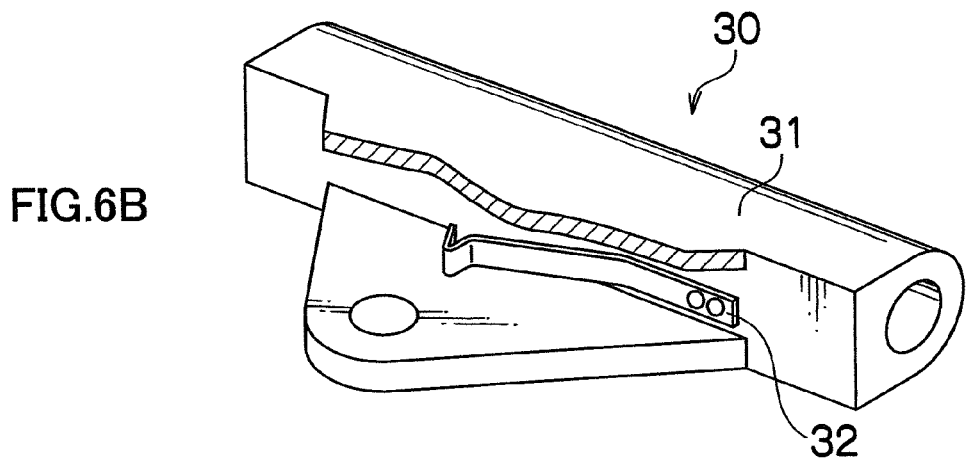

The hinge 30 includes a hinge body 31 and a leaf spring 32 as shown in FIGS. 6A and 6B.

The hinge body 31 is provided with the turn axis 14b and the tilt axis 16, which are orthogonal to each other. The hinge body 31 is turnably coupled with the first casing 10 with a shaft (not shown) inserted to serve as the turn axis 14b and also turnably coupled with the second casing 20 with a shaft 33 inserted to serve as the tilt axis 16. The shaft 33 is fixed with a nut 34. The hinge body 31 has its inside part hollow with the electric wires (not shown) passing through the hollow part to connect the first casing 10 and the second casing 20.

The leaf spring 32 is arranged inside the hinge body 31. As shown in FIG. 6B, the leaf spring 32 is a cantilever spring, of which an end is fixed to the hinge body 31. The other end of the leaf spring 32, which end is not fixed to the hinge body 31, fits in a groove 25 or a groove 26 formed on the second casing 20 shown in FIG. 7.

When the portable device 2 is in the closed state, the leaf spring 32 is engaged in the groove 25 on the second casing 20 as shown in FIG. 8 to keep the second casing 20 in the state aligned with the first casing 10, i.e., keep the state shown in FIG. 5A.

When the second casing 20 is turned to tilt counterclockwise with respect to the first casing 10 from the state in FIG. 8, the leaf spring 32 becomes engaged in the groove 26 on the second casing 20 as shown in FIG. 9 to keep the second casing 20 in the state tilting with respect to the first casing 10, i.e., keep the state shown in FIG. 5B.

Now, a method for handling the portable device 2 when the user holds the portable device 2 in the right hand is described.

When the user holds the portable device 2 in the closed state in the right hand and presses the left-hand side of the second casing 20 with the third finger and the little finger as shown in FIG. 10A, the second casing 20 is turned on the tilt axis 16 to slidingly tilt counterclockwise with respect to the first casing 10, so that the parts 10-2 and 20-2 to catch the user's fingers and thumb are made to protrude from behind the first and second casings 10 and 20 as shown in FIG. 10B. When the lateral pressure is applied to the portable device 2, the tilt regulating parts D1 and D2 make the second casing 20 naturally turned to tilt counterclockwise, which is not prevented by the tilt regulating parts D1 and D2, and the portable device 2 thereby changes in the state shown in FIG. 10B. In this state, the user holds the protruding part 10-2 with the middle finger, the third finger and the little finger while pushing up the protruding part 20-2 with the thumb, so that the user can stably hold the portable device 2 while easily opening the portable device 2. The portable device 2 having been just opened presents the appearance shown in FIG. 5C. The user can make the portable device 2 in the shape shown in FIG. 5D by returning the second casing 20 from the tilted state to the straight state with the thumb to make the portable device 2 ready for use.

The handling method is not limited to that described above, and another method described below may be used. As shown in FIG. 11B, when the user holds the portable device 2 with the right hand and slides the second casing 20 by pushing the upper part of the second casing 20 to right with the thumb, the second casing 20 is turned on the tilt axis 16 to slidingly tilt counterclockwise with respect to the first casing 10. Then, the first and second casings 10 and 20 become nonaligned with each other as shown in FIG. 11B, so that the parts 10-2 and 20-2 to catch the user's fingers and thumb are made to protrude from behind the first and second casings 10 and 20. In this case, even if the user forgets the proper direction to tilt the second casing 20 to open the portable device 2, the user can easily change the portable device 2 in the state that is easily opened by the right hand by only trying to sway the second casing 20 to find the direction to which the second casing 20 can be tilted, to easily make the portable device 2 in the state shown in FIG. 11B.

According to the second embodiment of the present invention, the portable device enables the user to stably hold the portable device while easily opening the first and second casings with one hand, and the portable device presents the appearance like a usual portable device even when the first and second casings are in the closed state. The second casing is allowed to tilt in only one direction, so that the user can easily tilt the second casing in the proper direction, which is easier for the user's hand more dominant than the other, by applying light lateral pressure. Moreover, the second casing can be kept in the tilting state, so that the user can hold the portable device while more easily opening the first and second casings with one hand.

The portable device described in the second embodiment is adapted to allow the second casing to turn to tilt counterclockwise in FIG. 10A with respect to the first casing in consideration of the case where the user holds, opens and closes the portable device with only the right hand. Alternatively, it is also possible that the portable device is adapted to allow the second casing to turn to tilt clockwise with respect to the first casing in consideration of the case where the user holds, opens and closes the portable device with only the left hand.

Figure 12A:
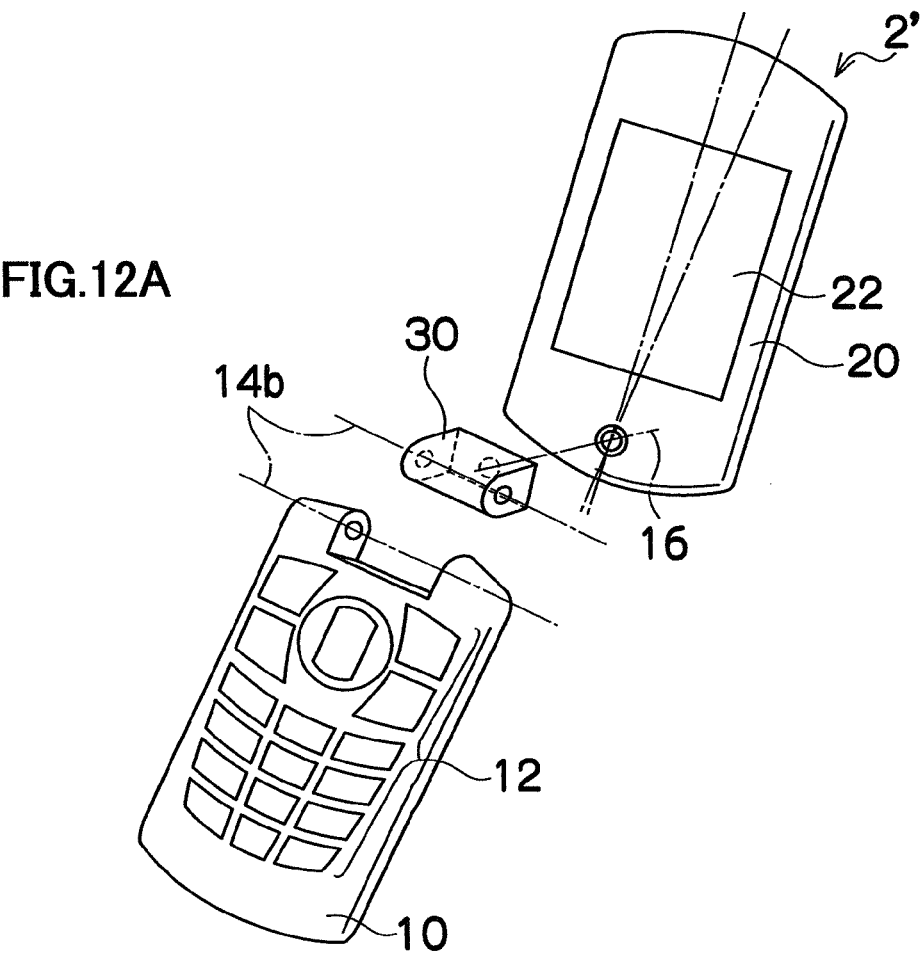
FIGS. 12A and 12B are external views of a modification of the portable device in the second embodiment.
Figure 12B:
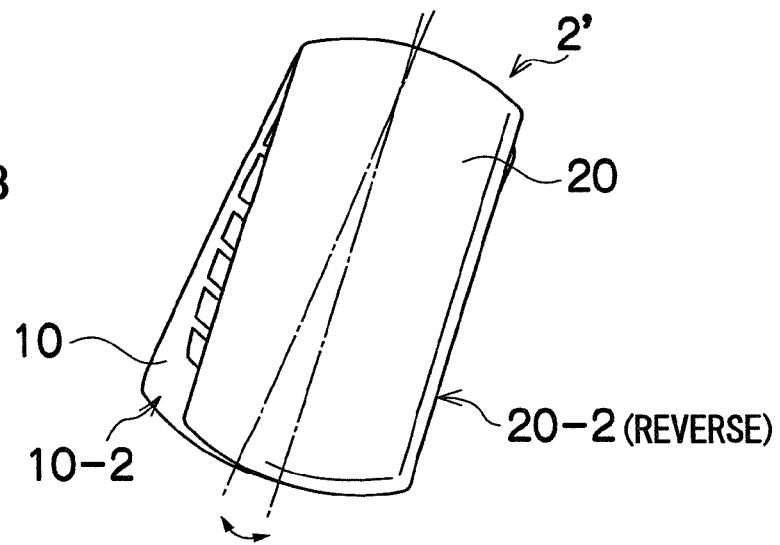

Although the portable device 2 has the hinge 30 that still appears when the portable device 2 is in the closed state, it is also possible to adapt a constitution as a portable device 2' shown in an exploded view in FIG. 12A, which is functionally the same with the portable device 2, in order to hide the hinge 30 when the portable device 2' is in the closed state as shown in FIG. 12B.

Figure 13A:
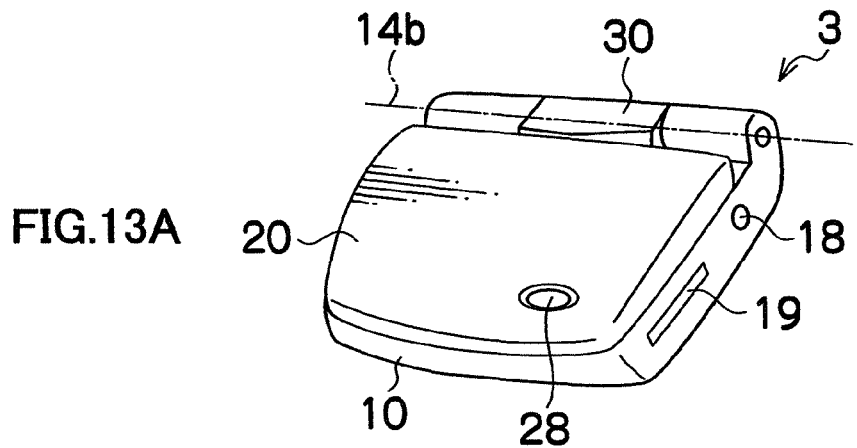
FIGS. 13A to 13C are external views of a modification of the portable device in the second embodiment.
Figure 13B:
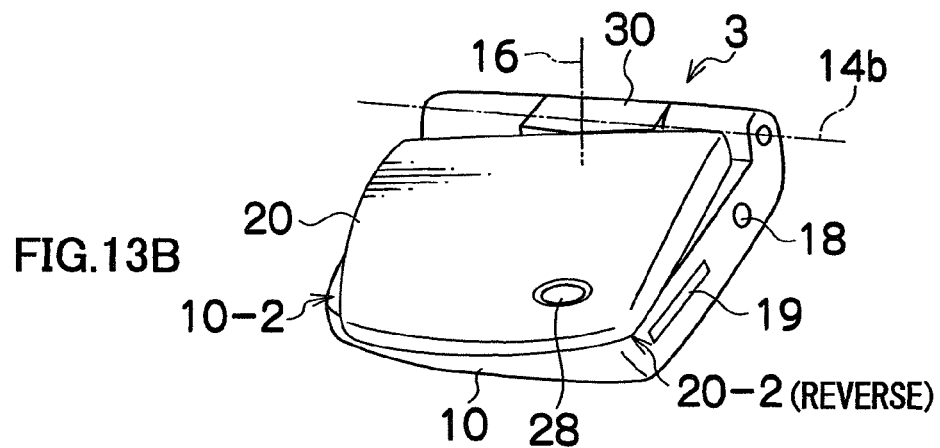
Figure 13C:
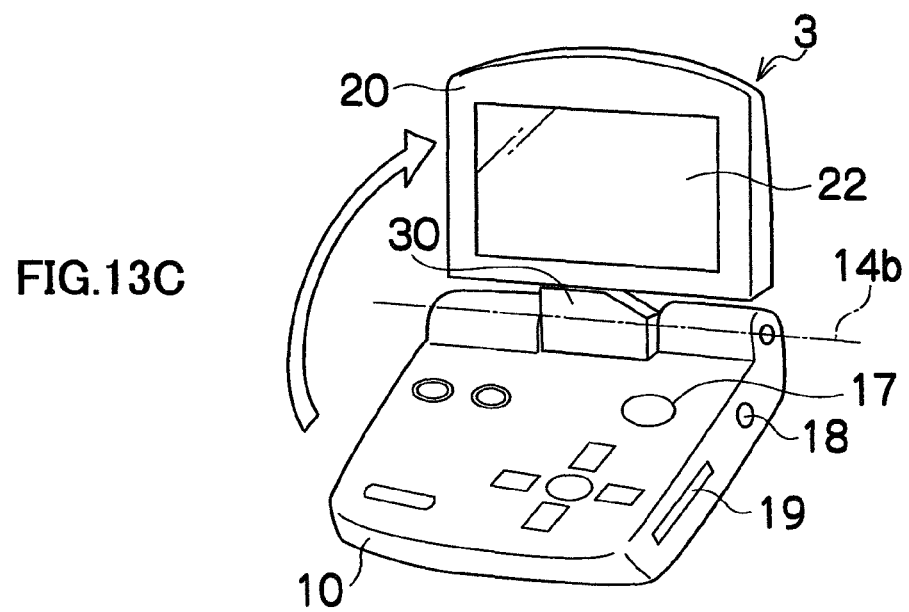

Although the portable device 2 has the display 22 used with the shorter side at the top, it is also possible to adapt a constitution as a portable device 3 shown in FIGS. 13A to 13C, which has the display 22 used with the longer side at the top. FIGS. 13A to 13C show appearances of the portable device 3, with which the user enjoys games, pictures and music by inserting cards in a card slot 19. FIG. 13A shows the portable device 3 in the closed state, FIG. 13B shows the state where the second casing 20 of the portable device 3 becomes non-aligned with the first casing 10, and FIG. 13C shows the portable device 3 in the opened state. On the side of the first casing 10 of the portable device 3, the card slot 19 for a card storing music or picture to be inserted, a headphone jack 18 for connecting a headphone and the like, for example, are arranged. On the inner face of the first casing 10, a shutter button 17 for releasing the shutter of the camera 28 for taking pictures of subjects and the like are arranged. On the outer face of the second casing 20, the camera 28 for taking pictures of subjects is arranged. By pressing the shutter button 17, the user can capture a moving picture or a still picture of the subject with the camera 28 and record the picture.

Third Embodiment

The portable device in the second embodiment of the present invention is provided with the hinge having the tilt axis on which the second casing is allowed to tilt to protrude the parts 10-2 and 20-2 to catch the user's fingers and thumb; however, the manner to protrude the parts 10-2 and 20-2 is not limited to that and it is also possible to allow the second casing to tilt by using an elastic member such as a spring.

Figure 14:
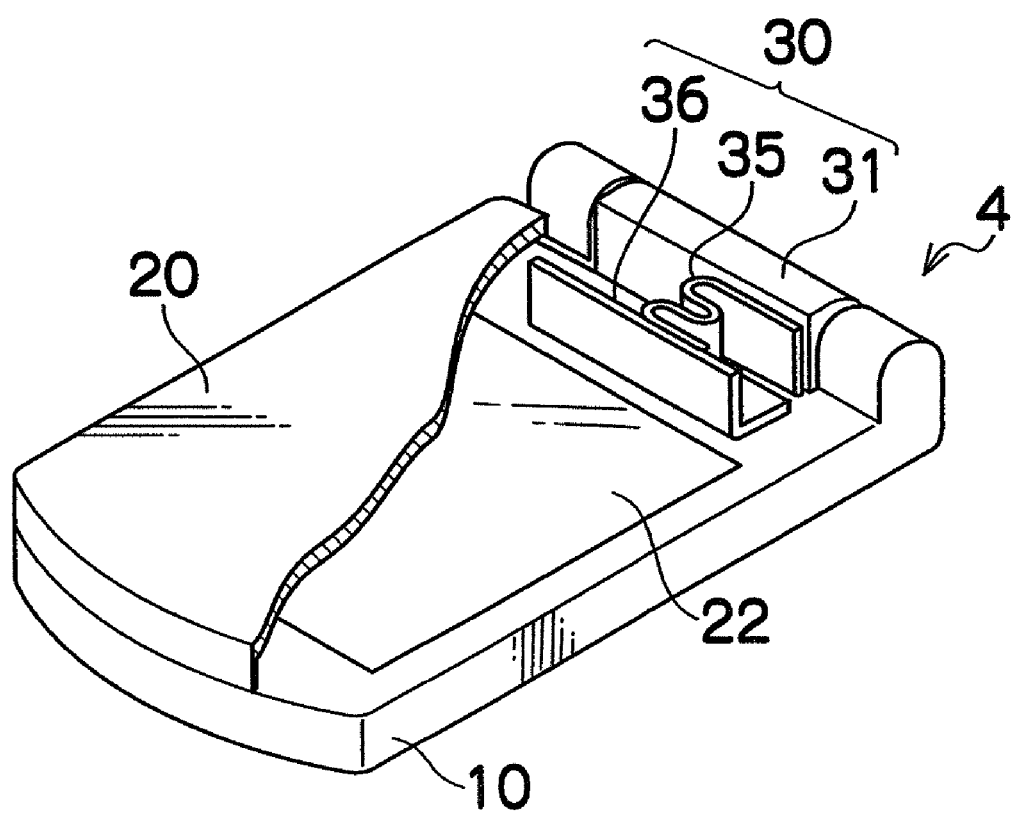
FIG. 14 is an oblique view of a portable device according to a third embodiment of the present invention.

The portable device according to the third embodiment of the present invention allows the second casing to tilt through a hinge spring as the tilting mechanism. FIG. 14 is an oblique view to make the inner structure of a portable device 4 according to the third embodiment see through. The same parts as those in the first and second embodiments are denoted with the same reference numerals in the drawing, and are not described here.

The hinge 30 of the portable device 4 includes the hinge body 31, the hinge spring 35, and an L-shaped member 36.

The hinge body 31 is turnably coupled with the first casing 10 with a shaft (not shown).

The hinge spring 35 is an elastic member made of metal such as a stainless steel spring, with an end attached to the hinge body 31 and the other end attached to the L-shaped member 36.

The L-shaped member 36 has an end fixed to the hinge spring 35, and the other end fixed to the second casing 20.

Now, a method for tilting the second casing 20 is described.

Figure 15A:
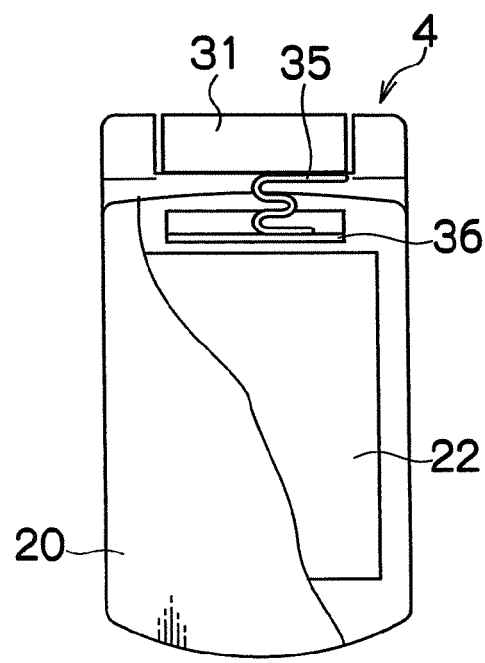
FIGS. 15A and 15B are views of the portable device in the third embodiment.
Figure 15B:
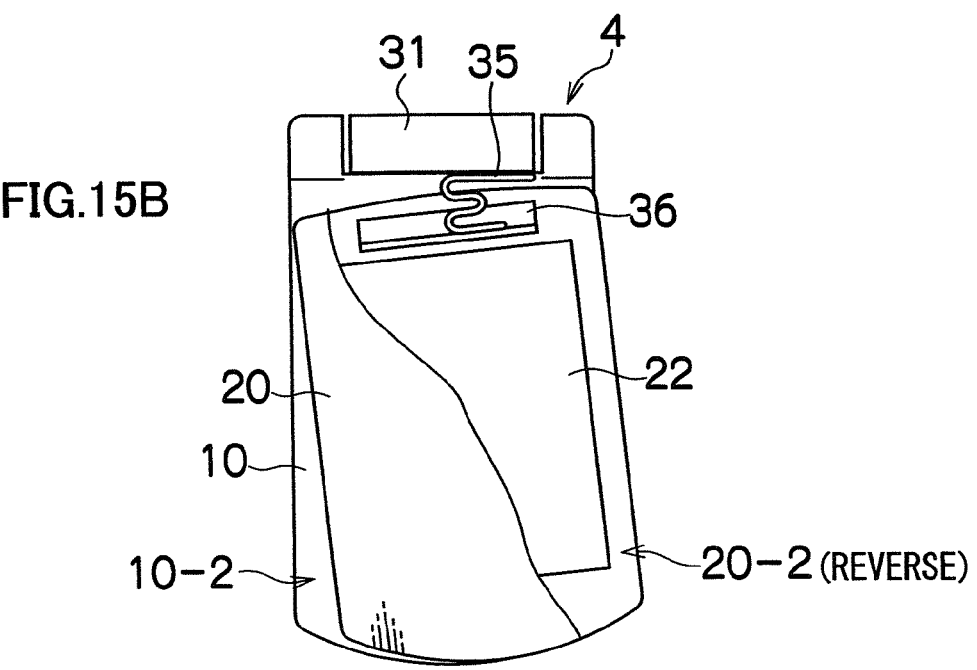

FIG. 15A shows the portable device 4 in the closed state. When the force is applied to the left-hand side of the second casing 20 in FIG. 15A with respect to the first casing 10, the hinge spring 35 is bent to slidingly tilt the second casing 20 counterclockwise with respect to the first casing 10, so that the parts 10-2 and 20-2 to catch the user's fingers and thumb are made to protrude from behind the first and second casings 10 and 20 as shown in FIG. 15B. Although not shown in the drawings, when the force is applied to the right-hand side of the second casing 20 in FIG. 15A with respect to the first casing 10, the parts 10-2 and 20-2 to catch the user's fingers and thumb are made to protrude from behind the sides of the first and second casings 10 and 20 which sides are opposite to those shown in FIG. 15B.

According to the third embodiment of the present invention, the portable device with simple configuration enables the user to stably hold the portable device while easily opening the first and second casings with one hand, and the portable device presents the appearance like a usual portable device even when the first and second casings are in the closed state.

Although the portable device described in the third embodiment is provided with no click mechanism, it is also possible that the portable device is provided with a click mechanism with the same configuration as that of the second embodiment at a place other than the place where the hinge spring is arranged.

Although the portable device described in the third embodiment is adapted to allow the second casing 20 to slidingly tilt in both the clockwise direction and the counterclockwise direction with respect to the first casing 10, it is also possible that the portable device is provided with the tilt regulating parts to allow the second casing 20 to tilt in only one of the clockwise direction and the counterclockwise direction with respect to the first casing 10.

Fourth Embodiment

The portable device in the second embodiment is adapted to be opened with the parts to catch the user's fingers and thumb made to protrude from behind the first and second casings and have the second casing tilted with respect to the first casing when the portable device has been just opened; however, it is also possible that the portable device is adapted to align the second casing straight with the first casing in the portable device just opened.

Figure 16A:
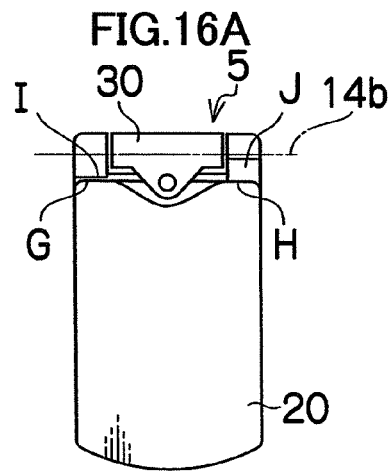
FIGS. 16A to 16F are external views of a portable device according to a fourth embodiment of the present invention.
Figure 16B:
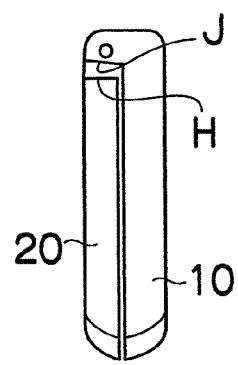
Figure 16C:
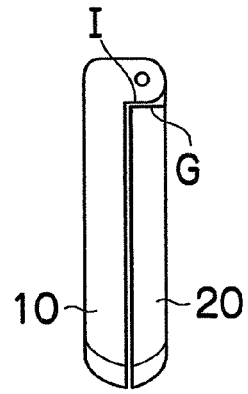
Figure 16D:
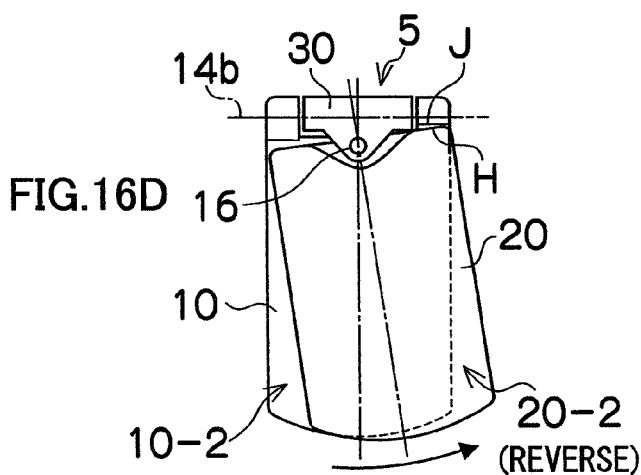
Figure 16E:
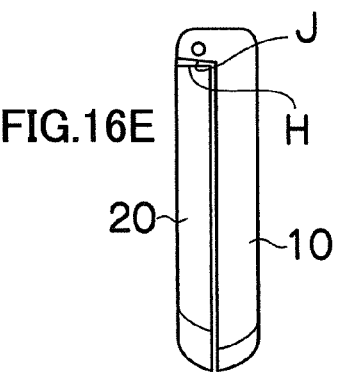
Figure 16F:
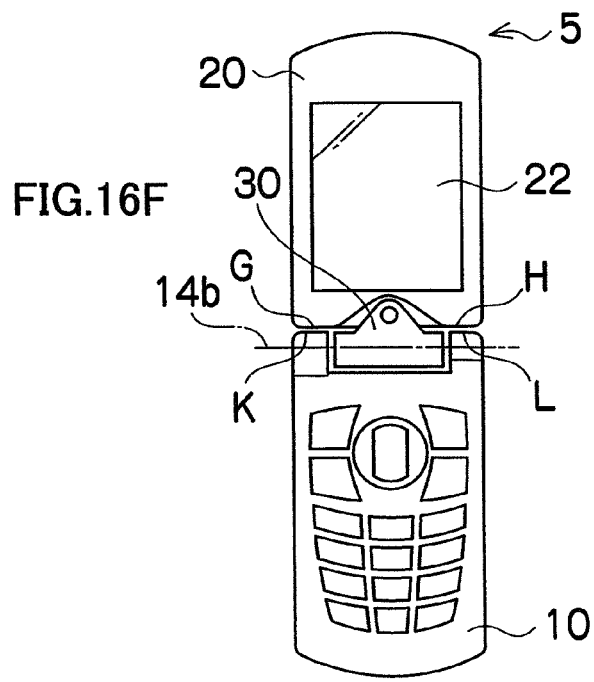

The portable device according to the fourth embodiment of the present invention enables the user to open the second casing from the state where the parts to catch the user's fingers and thumb are made to protrude from behind the first and second casings, and has the first and second casings not tilted with respect to each other in the portable device just opened. FIGS. 16A to 16F show appearances of a portable device 5 according to the fourth embodiment. FIGS. 16A to 16C show the portable device 5 in the closed state, in which FIG. 16A is a front view, FIG. 16B is a right-side view, and FIG. 16C is a left-side view. FIGS. 16D and 16E show a state where the second casing 20 has been tuned to tilt slidingly with respect to the first casing 10 in the closed state, in which FIG. 16D is a front view and FIG. 16E is a right-side view. FIG. 16F is a front view of the portable device 5 having been just opened. The same parts as those in the first and second embodiments are denoted with the same reference numerals in the drawings, and are not described here.

The hinge 30, which has a click mechanism (not shown) inside, joins the first casing 10 and the second casing 20 with the two kinds of freedom: the freedom in the opening and closing directions and the freedom in the tilting directions. The portable device 5 is provided with tilt regulating parts G, H, I, J, K, L and M for regulating the turn of the second casing 20 in the tilting directions.

Now, a method for regulating the turn of the second casing 20 in the tilting direction is described.

When the portable device 5 is in the closed state shown in FIGS. 16A to 16C, there is a certain space between the tilt regulating parts H and J, and the second casing 20 is thereby allowed to turn to tilt counterclockwise in FIG. 16A slidingly with respect to the casing 10 until the tilt regulating parts H and J abut against each other; on the other hand, there is little space between the tilt regulating parts G and I, and the second casing 20 is thereby prevented from turning to tilt clockwise with respect to the casing 10.

Figure 17:
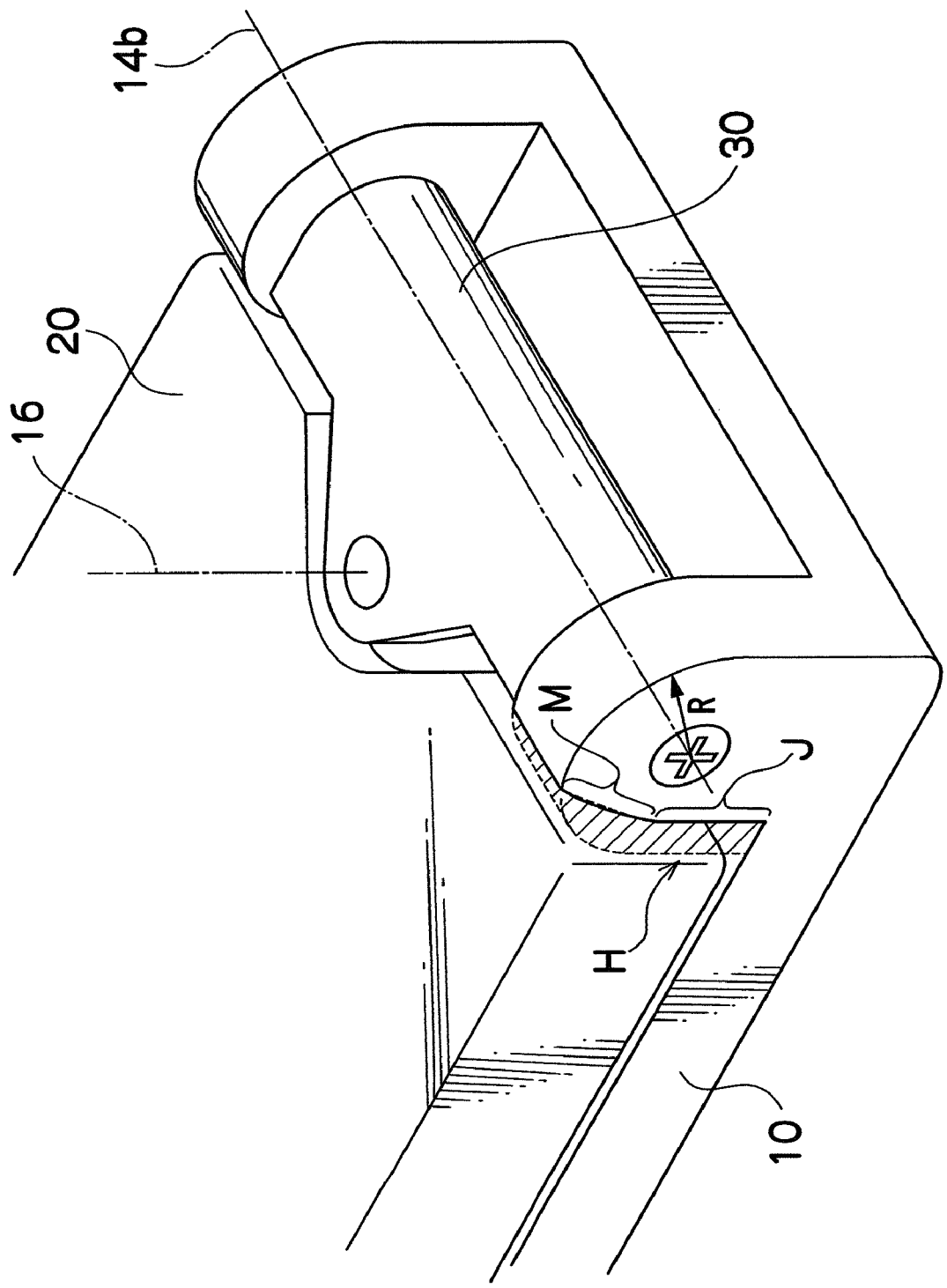
FIG. 17 is an oblique view of the portable device in the fourth embodiment.

FIG. 17 is an enlarged view of the parts around the hinge 30 of the portable device 5 in the state in FIGS. 16A to 16C. There is the certain space between the tilt regulating part H and each of the tilt regulating parts J and M. The tilt regulating parts J and M have shapes as if made by removing a part hatched in FIG. 17 from a part shown with dotted lines in FIG. 17 constituted of a semicircular cylindrical part having the center axis on the turn axis 14b and the radius R and a straight part continuing from the semicircular cylindrical part.

Figure 18:
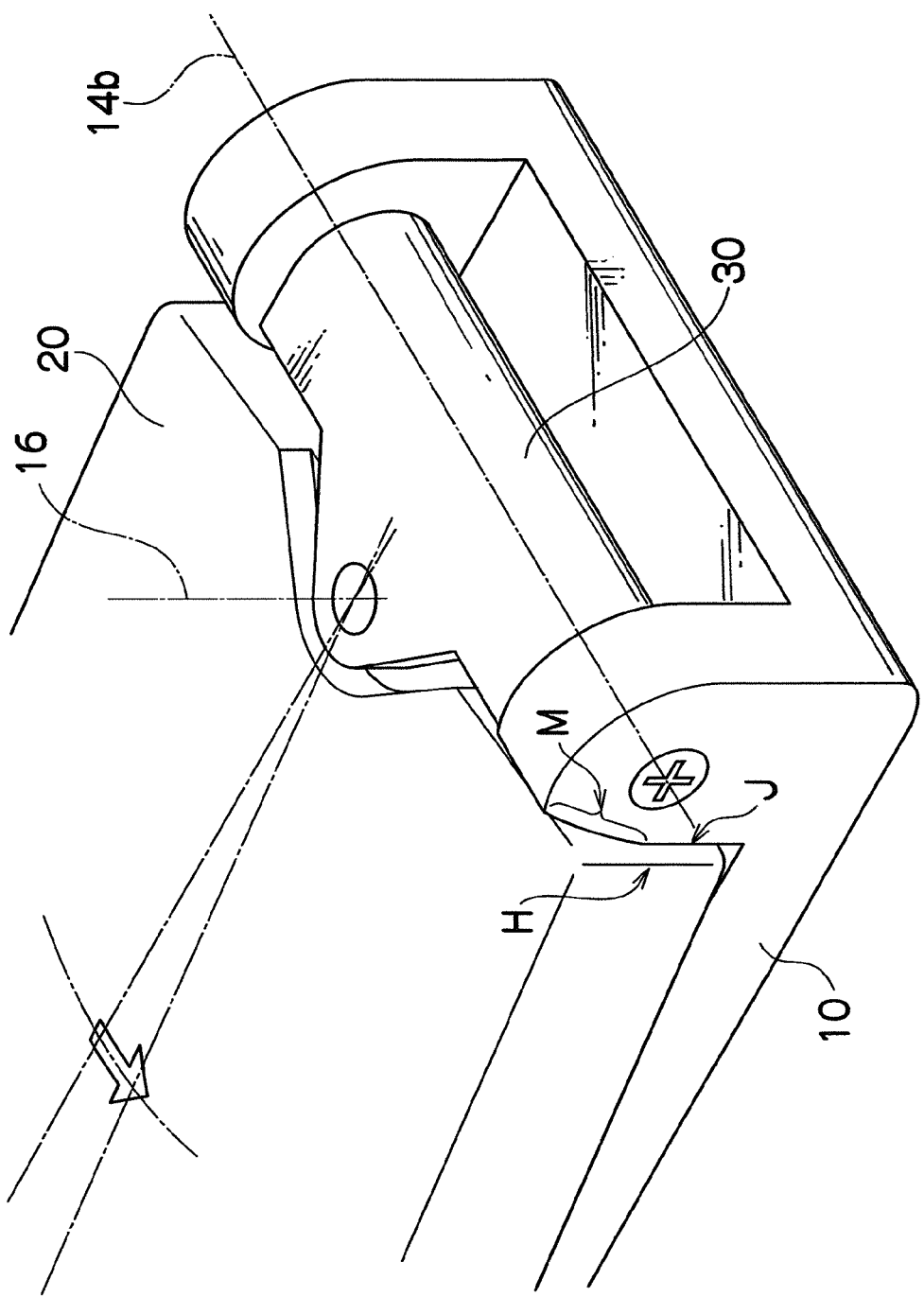
FIG. 18 is an oblique view of the portable device in the fourth embodiment.

When the second casing 20 is turned to tilt to make the parts 10-2 and 20-2 to catch the user's fingers and thumb protrude from behind the casings 10 and 20, the tilt regulating parts H and J abut against each other as shown in FIG. 18 (also in FIGS. 16D and 16E). Since the tilt regulating parts H and J abut against each other in the state shown in FIGS. 16D, 16E and 18, the second casing 20 is prevented from turning to tilt further. The click mechanism (not shown) arranged in the hinge 30 keeps the second casing 20 in this position in the tilting direction.

While the second casing 20 is turned to open from the state in FIG. 18, the tilt regulating part H of the second casing 20 leaves the tilt regulating part J and touches the tilt regulating part M, and further moves along the tilt regulating part M. At the same time, the turn of the second casing 20 in the tilting direction is gradually straightened by the tilt regulating part M. When the second casing 20 is further turned in the opening direction to open perpendicularly to the first casing 10 as shown in FIG. 19, the tilt regulating part H of the second casing 20 leaves the tilt regulating part M and touches the tilt regulating part L, which makes the tilt of the second casing 20 with respect to the first casing 10 substantially zero degrees, i.e., makes the first and second casings 10 and 20 aligned straight without any tilt. The click mechanism (not shown) arranged in the hinge 30 keeps the second casing 20 in this position in the tilting direction in the state where the second casing 20 is aligned with the first casing 10 without any tilt. Thereby, the state where the first and second casings 10 and 20 are aligned to each other can be kept with no play, even if the dimensions of the tilt regulating parts L and K are not precisely adjusted.

When the second casing 20 is further turned to open from the state in FIG. 19, the first and second casings 10 and 20 become in the opened state as they are aligned straight without any tilt as shown in FIG. 16F.

According to the fourth embodiment of the present invention, when the user holds the portable device and applies light lateral pressure on the portable device with one hand, the first and second casings become nonaligned with each other and easier to open, and when the user opens the portable device, the first and second casings return to the state aligned with each other. Hence, the portable device enables the user to stably hold the portable device while easily opening the first and second casings with one hand, and is thus easily handled to further improve the operability.

Although the portable device described in the fourth embodiment is adapted to return the first and second casings to the aligned state without any tilt when they are opened about 90 degrees, the place for the first and second casings to return to the aligned state is not limited to that and can be variously designed by changing the position and/or the slope of the tilt regulating part M.

Although the portable device described in the fourth embodiment is adapted to join the first and second casings through the hinge having the two kinds of freedom in the opening and closing directions and in the tilting directions, the coupling of the first and second casings is not limited to that. It is also possible that the first and second casings are joined through a hinge having the freedom only in the opening and closing directions, and the first and second casings are provided with the freedom in the tilting directions by an elastic member such as a hinge spring.

Fifth Embodiment

The portable device in the second embodiment is adapted to be opened with the parts to catch the user's fingers and thumb made to protrude from behind the first and second casings and have the second casing tilted with respect to the first casing when the portable device has been just opened; however, it is also possible that the portable device is adapted to align the second casing straight with the first casing in the portable device just opened.

Figure 20A:
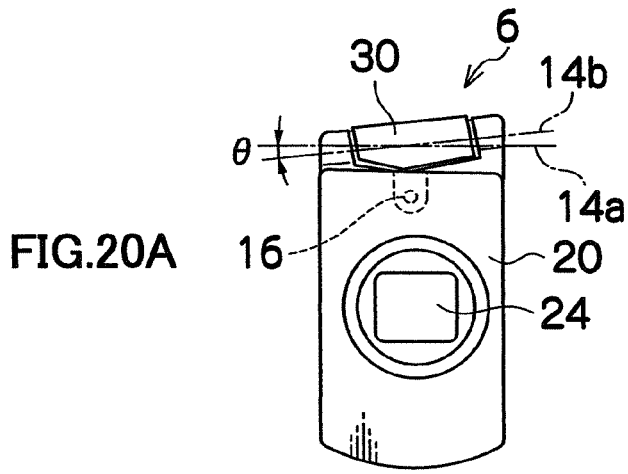
FIGS. 20A to 20C are external views of a portable device according to a fifth embodiment of the present invention.
Figure 20B:
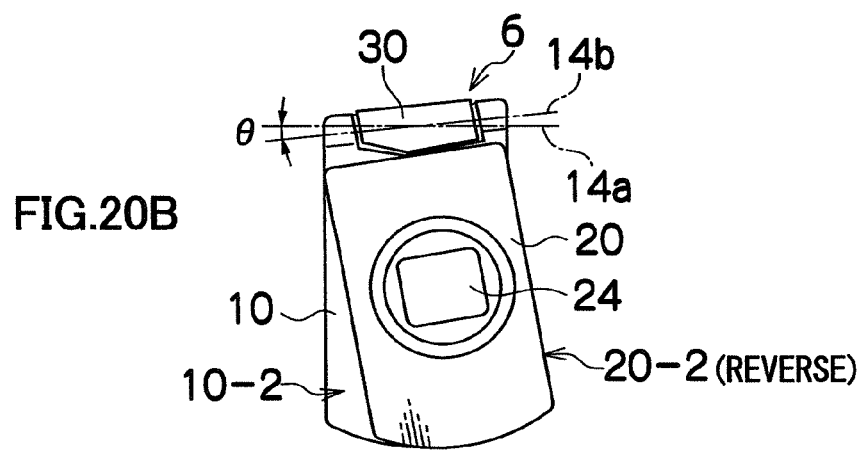
Figure 20C:
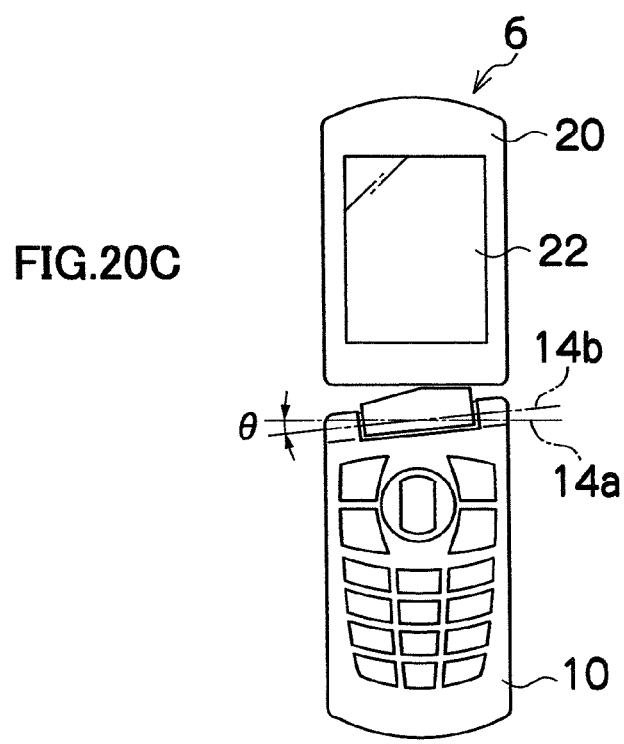

The portable device according to the fifth embodiment of the present invention is adapted to have an oblique hinge to enable the user to open the second casing from the state where the parts to catch the user's fingers and thumb are made to protrude from behind the first and second casings, and have the first and second casings not tilted with respect to each other in the portable device just opened. FIGS. 20A to 20C show appearances of a portable device 6 according to the fifth embodiment, in which FIG. 20A shows the portable device 6 in the closed state, FIG. 20B shows a state where the second casing 20 of the portable device 6 has been turned to tilt slidingly with respect to the first casing 10 in the closed state, and FIG. 20C shows a state where the portable device 6 has been just opened. The same parts as those in the first and second embodiments are denoted with the same reference numerals in the drawings, and are not described here.

The portable device 6 is foldable, and includes: the first casing 10, the second casing 20 having the displays 22 and 24 for displaying information such as pictures, and the hinge 30 joining the first casing 10 and the second casing 20 together.

The hinge 30 joins the first casing 10 and the second casing 20 with the two kinds of freedom in the opening and closing directions and in the tiling directions. The turn axis 14b of the hinge 30 is tilted counterclockwise in FIGS. 20A to 20C by θ with respect to the line 14a perpendicular to the longitudinal side of the substantially rectangular appearance of the portable device 6 in the opened state shown in FIG. 20C. The hinge 30 is provided with the click mechanism (not shown) inside to keep the second casing 20 in each of the positions in the tilting direction shown FIGS. 20A and 20B.

The main display 22 has a rectangular shape of a predetermined aspect ratio, and is arranged on the surface of the second casing 20 which surface comes inside when the portable device 6 is folded, in such a manner that the main display 22 is mainly used with the shorter side at the top. The outside display 24 is arranged on the surface of the second casing 20 which surface comes outside when the portable device 6 is folded.

When the portable device 6 is carried (i.e., when the portable device 6 is in the closed state), the portable device 6 can be carried in a compact state with no parts protruding from behind the first and second casings 10 and 20 as shown in FIG. 20A. The click mechanism (not shown) arranged in the hinge 30 keeps the second casing 20 in this position in the tilting direction. When lateral pressure is applied to the portable device 6 in the closed state, the second casing 20 is turned on the tilt axis 16 arranged adjacent to the turn axis 14b to tilt counterclockwise in FIG. 20A slidingly with respect to the first casing 10, so that the parts 10-2 and 20-2 to catch the user's fingers and thumb are made to protrude as shown in FIG. 20B. The click mechanism (not shown) arranged in the hinge 30 keeps the second casing 20 in this position in the tilting direction. In this state, the user holds the protruding part 10-2 with the fingers while pushing up the protruding part 20-2 with the thumb, so that the user can stably hold the portable device 6 while easily opening the portable device 6, resulting in the state shown in FIG. 20C. Thus, the first and second casings 10 and 20 are not tilted with respect to each other even when the portable device 6 has been just opened, and then the user can naturally work on the portable device 6.

Although the user can close the portable device 6 in a procedure reverse to the opening procedure described above, it is also possible that the user brings the portable device 6 in the state in FIG. 20C to the state in FIG. 20A with a single motion without through the state in FIG. 20B, by slightly pressing the second casing 20 from the right-hand side in FIG. 20C while closing the second casing 20.

According to the fifth embodiment of the present invention, the portable device enables the user to stably hold the portable device while easily opening the first and second casings with one hand with the minimum operations. Moreover, the portable device is capable of preparing the protruding parts 10-2 and 20-2 to catch the user's fingers and thumb, although the portable device presents the appearances (the first and second casings) having no tilt in both the closed state and the opened state. That improves the operability.

Sixth Embodiment

The portable device in the second embodiment is adapted to allow the user to open the portable device and then to work on the portable device; however, the portable device is not limited to be worked on in that style.

Figure 21A:
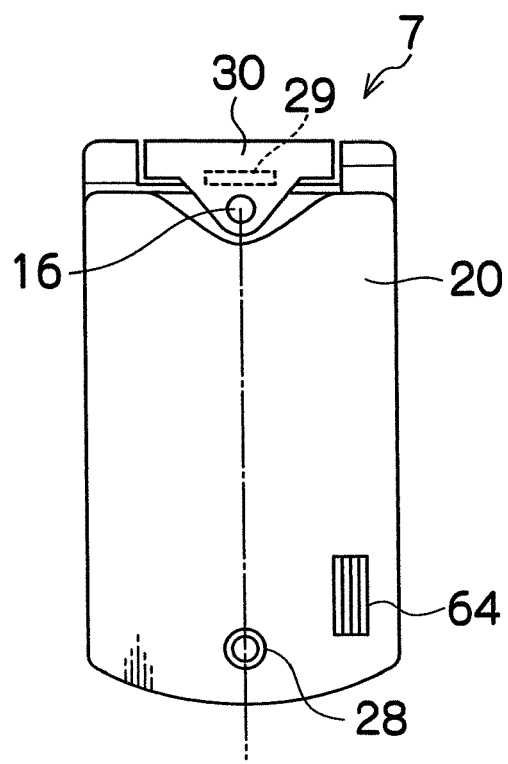
FIGS. 21A and 21B are external views of a portable device according to a sixth embodiment of the present invention.
Figure 21B:
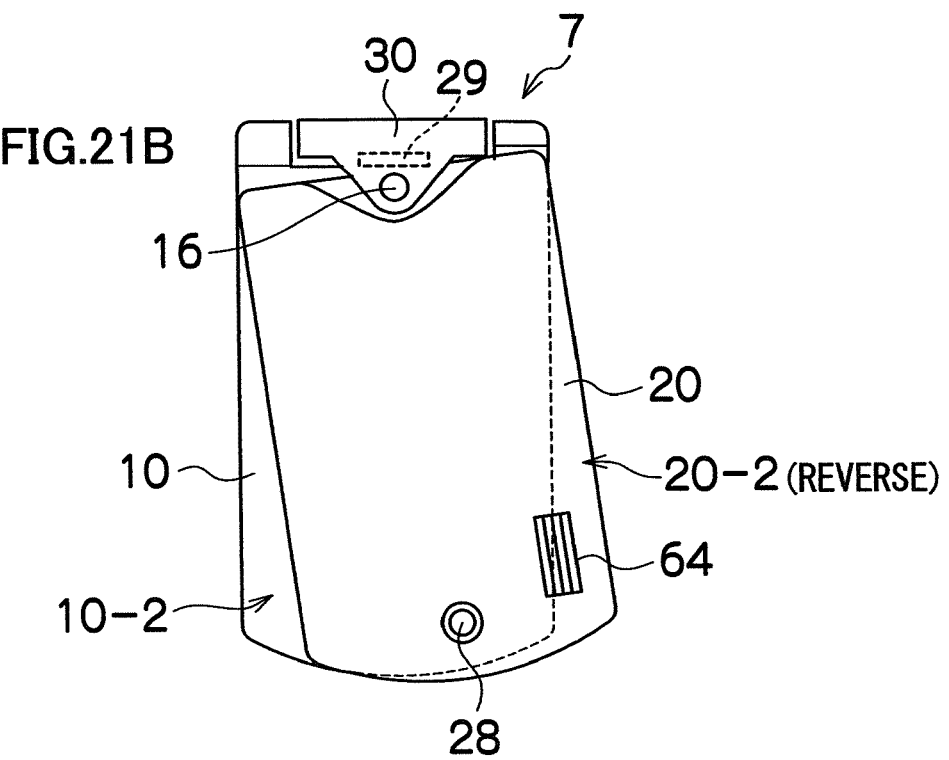

The portable device according to the sixth embodiment of the present invention starts to operate in a predetermined mode upon the turning of the second casing to tilt slidingly with respect to the first casing. FIGS. 21A and 21B show appearances of a portable device 7 according to the sixth embodiment, in which FIG. 21A shows the portable device 7 in the closed state, and FIG. 21B shows a state where the second casing 20 of the portable device 7 has been turned to tilt slidingly with respect to the first casing 10 in the closed state. The same parts as those in the first and second embodiments are denoted with the same reference numerals in the drawings, and are not described here.

The camera 28 for taking pictures of subjects and the flashlight 64 for illuminating the subjects are arranged on the outer face of the second casing 20.

The hinge 30 is provided with the click mechanism (not shown) inside to keep the second casing 20 in each of the positions in the tilting direction shown FIGS. 21A and 21B. The click mechanism is provided with a tilt detecting switch 29, which is turned on when the second casing 20 stops at the position in FIG. 21B.

When the second casing 20 is turned on the tilt axis 16 to slidingly tilt counterclockwise with respect to the first casing 10 from the state in FIG. 21A, the portable device 7 assumes the state in FIG. 21B, and the CPU 40 detects through the tilt detecting switch 29 that the second casing 20 reaches the position in FIG. 21B.

Upon detecting that the second casing 20 reaches the position in FIG. 21B, the CPU 40 commands the flashlight controlling unit 62 to start charging the flashlight 64. Although it takes a certain time for the flashlight 64 to become able to emit light from the time the charging started, the user can take a still picture or a moving picture of a subject by using the flashlight 64 immediately after opening the portable device 7, since the portable device 7 starts the charging of the flashlight 64 upon becoming in the state in FIG. 21B.

According to the sixth embodiment of the present invention, the turning of the second casing to tilt slidingly with respect to the first casing is detected, and the portable device automatically operates in various modes according to the detected motion. That makes the operation easier, improving operability.

Although the portable device described in the sixth embodiment is adapted to join the first and second casings through the hinge having the two kinds of freedom in the opening and closing directions and in the tilting directions, the coupling of the first and second casings is not limited to that. It is also possible that the first and second casings are joined through a hinge having the freedom only in the opening and closing directions, and the first and second casings are provided with the freedom in the tilting directions by an elastic member such as a hinge spring.

Seventh Embodiment

The portable device in the second embodiment is adapted to open the first and second casings by about 180 degrees to each other with the parts to catch the user's fingers and thumb made to protrude from behind the first and second casings, and have the display used with the shorter side at the top; however, it is also possible that the portable device is adapted to allow the display to be also used with the longer side at the top.

Figure 22A:
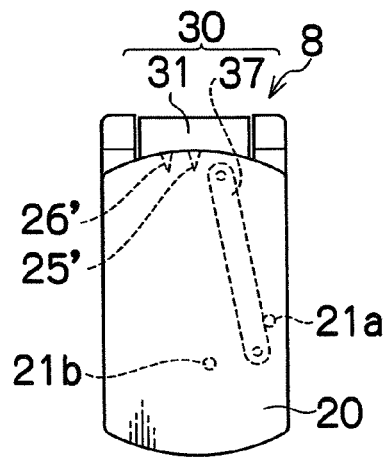
FIGS. 22A to 22E are external views of a portable device according to a seventh embodiment of the present invention.
Figure 22B:
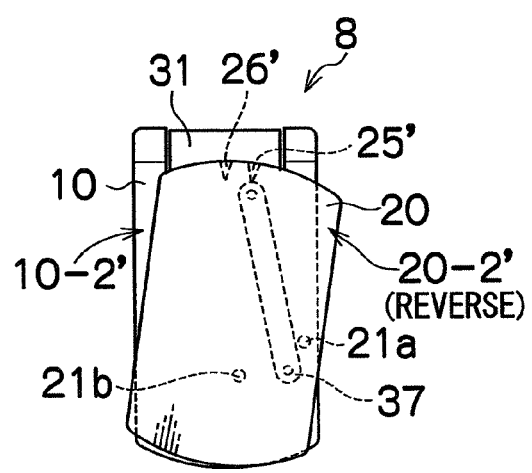
Figure 22C:
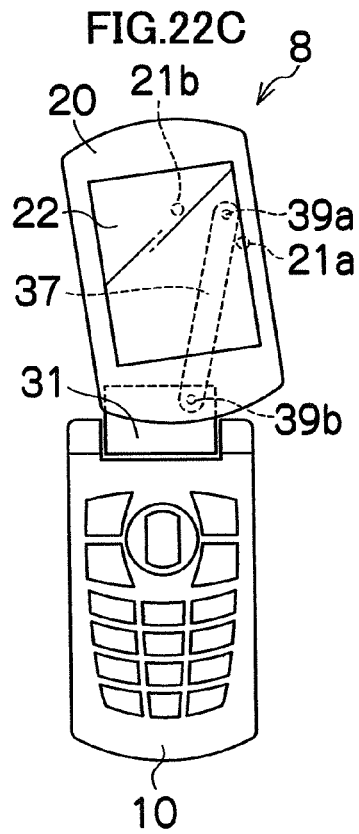
Figure 22D:
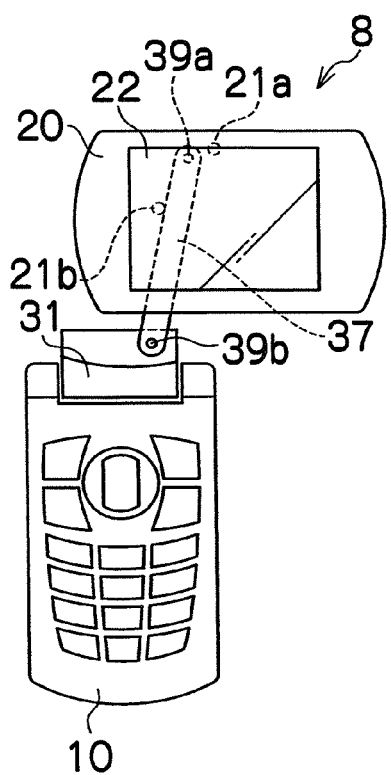
Figure 22E:
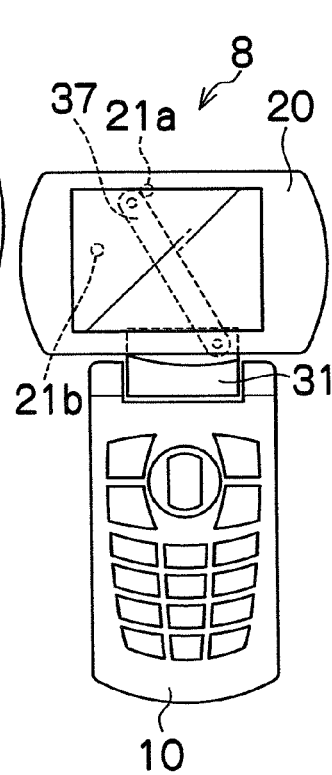

The portable device of the seventh embodiment enables the user to open the second casing from the state where the parts to catch the user's fingers and thumb are made to protrude from behind the first and second casings, and to set the display to be used with either of the shorter side and the longer side at the top in the opened state. FIGS. 22A to 22E show appearances of a portable device 8 according to the seventh embodiment, in which FIG. 22A shows the portable device 8 in the closed state, FIG. 22B shows a state where the second casing 20 of the portable device 8 has been turned to tilt slidingly with respect to the first casing 10 in the closed state, FIG. 22C shows a state where the portable device 8 has been just opened, FIG. 22D shows a transitional state to set the display 22 to be used with the longer side at the top, and FIG. 22E shows a state where the display 22 has been set to be used with the longer side at the top. The same parts as those in the first and second embodiments are denoted with the same reference numerals in the drawings, and are not described here.

The portable device 8 is foldable, and includes: the first casing 10, the second casing 20 having the display 22 for displaying information such as pictures, and the hinge 30 joining the first casing 10 and the second casing 20 together.

The hinge 30 includes the hinge body 31 and a link 37.

The link 37 has an end pivoted on the hinge body 31 and the other end pivoted on the display 22 in the second casing 20.

The second casing 20 is provided with regulating pins 21a and 21b for regulating turning of the second casing 20.

The first casing 10 and the second casing 20 are joined through the hinge 30 including the link 37 and allowed to turn in the opening and closing directions and in the tiling directions. The hinge 30 is provided with the click mechanism (not shown) inside to keep the second casing 20 in each of the positions shown FIGS. 22A and 22B so as not to unexpectedly turn. The first casing 10 and the second casing 20 are electrically connected through a connecting device such as the flexile printed circuit board (not shown).

The configuration of the hinge 30 is described.

Figure 23:
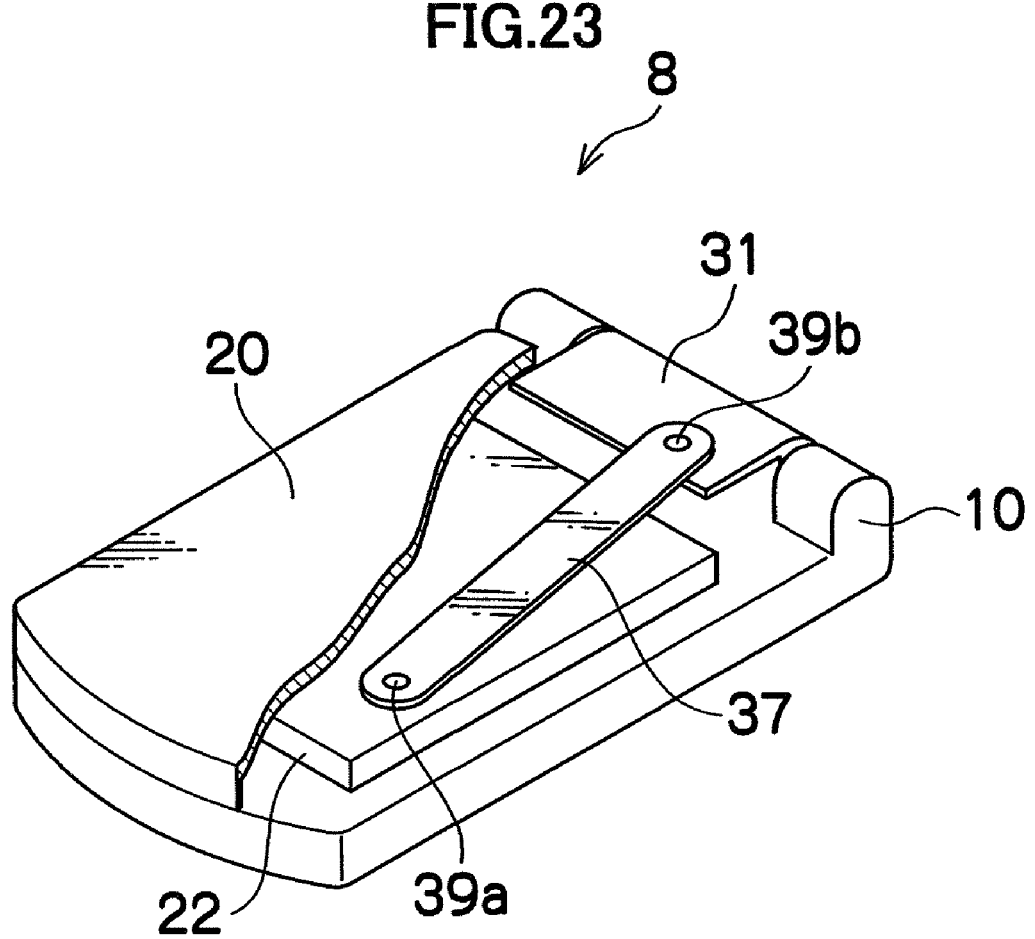
FIG. 23 is an oblique view of the portable device in the seventh embodiment.

As shown in FIGS. 23 and 24, the link 37 has the end pivoted on the hinge body 31 and the other end pivoted on the display 22 fixed in the second casing 20.

The link 37 is pivoted on the hinge body 31 with an axis 39b provided adjacent to the turn axis 14b, on which the hinge body 31 turns with the second casing 20 in the opening and closing directions. The link 37 is pivoted on the display 22 with an axis 39a. This configuration allows the first casing 10 connected to the hinge body 31 and the second casing 20 fixed to the display 22 to turn in parallel with the link 37 on the axes 39a and 39b. Each pivot has an approximate friction applied so that it is not displaced.

Now, a method for making parts 10-2' and 20-2' to catch the user's fingers and thumb protrude from behind the first and second casings 10 and 20 in a case where lateral pressure is applied to the portable device 8 is described.

In the state shown in FIG. 22A, the end of the leaf spring (not shown) of the click mechanism (not shown) with the other end fixed to the hinge body 31 fits in a groove 25' formed on the second casing 20, and the second casing 20 is thereby kept in this state.

The regulating pin 21a allows the second casing 20 to turn only in the clockwise direction in FIG. 22A slidingly with respect to the first casing 10. Accordingly, when pressure is applied to the side of the second casing 20 in that state, the force diverts in the direction in which the second casing 20 is not prevented from turning, and then the second casing 20 turns clockwise as a matter of course. At this moment, the end of the leaf spring leaves the groove 25', and is drawn into the groove 26' formed on the second casing 20 adjacent to the groove 25'. Thereby, the second casing 20 is kept in the state in FIG. 22B.

Thus, the parts 10-2' and 20-2' to catch the user's fingers and thumb are made to protrude from behind the first and second casings 10 and 20 underside of the second casing 20 near the hinge body 31 as shown in FIG. 22B.

Now, a method for setting the display 22 to be used with each of the shorter side and the longer side at the top is described.

When the user opens the first casing 10 and the second casing 20 by using the protruding parts 10-2' and 20-2' to catch the user's fingers and thumb from the state in FIG. 22B, the portable device 8 assumes the state in FIG. 22C.

If the user turns the second casing 20 on the axis 39a clockwise from the state in FIG. 22C, the display 22 is set to be used with the shorter side at the top.

If the user turns the second casing 20 counterclockwise on the axis 39a from the state in FIG. 22C until the link 37 abuts against the regulating pin 21b, the display 22 is set to be used with the longer side at the top as shown in FIG. 22D.

Although the portable device 8 has already been ready for use even in the state in FIG. 22D, the user might be annoyed by the offset between the first casing 10 and the second casing 20. In such a case, the user can place the first and second casings 10 and 20 symmetrically as shown in FIG. 22E by turning the second casing 20 on the axis 39b.

Now, a method for handling the portable device 8 is described.

Figure 25A:
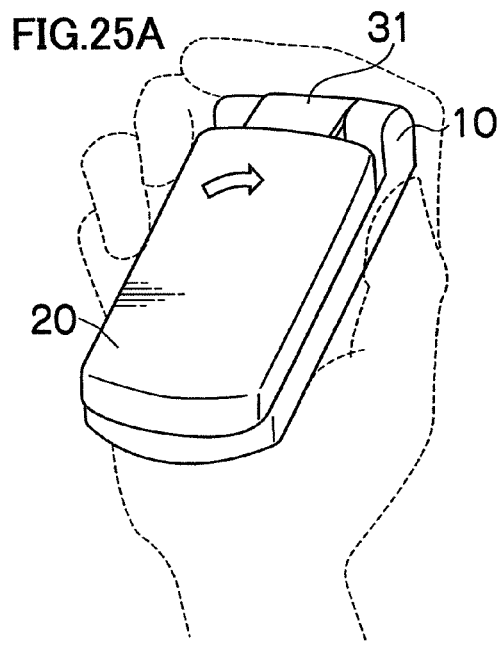
FIGS. 25A to 25D are illustrations of a handling method of the portable device in the seventh embodiment.
Figure 25B:
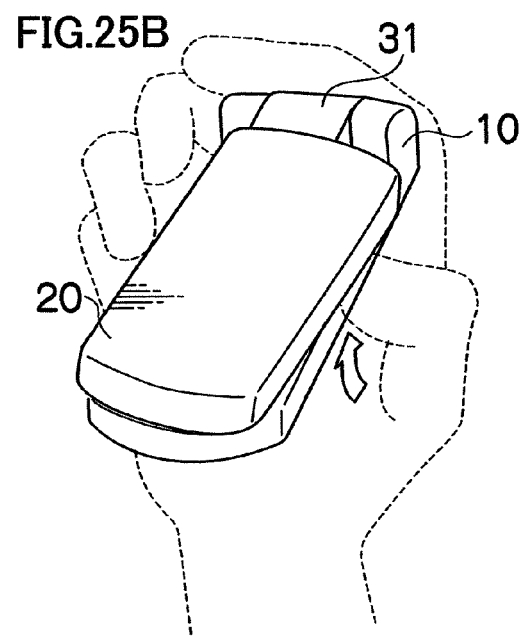
Figure 25C:
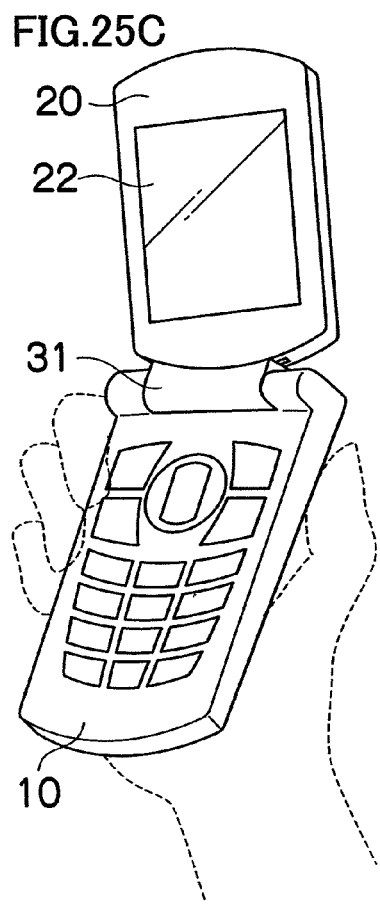

When the user holds the portable device 8 in the closed state in the right hand and presses the lower part near the hinge body 31 of the second casing 20 with the middle finger and the third finger of the right hand as shown in FIG. 25A, the parts 10-2' and 20-2' to catch the user's fingers and thumb are made to protrude from behind the first and second casings 10 and 20 as shown in FIG. 25B.

When the user pushes up the second casing 20 with the thumb in the state in FIG. 25B, the first casing 10 and the second casing 20 are easily opened to assume the state shown in FIG. 22C.

The user may instantly use the portable device 8 in the state in FIG. 22C. If the user wants to set the display 22 to be used with the shorter side at the top such as to make a phone call or display character information, the user turns the second casing 20 clockwise with the right thumb or the left hand to align the second casing 20 straight with the first casing 10 without any tilt so as to set the display 22 to be used with the shorter side at the top.

Figure 25D:
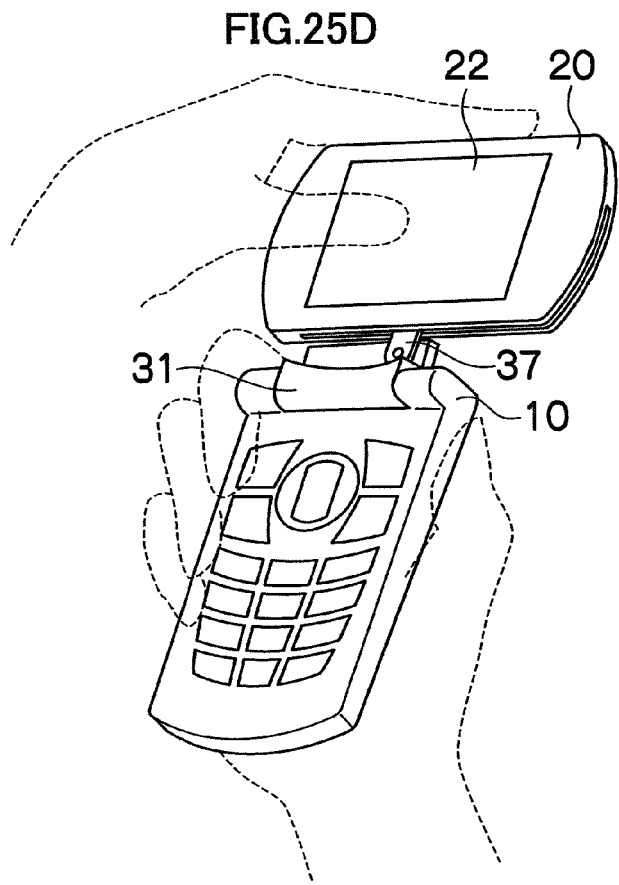

If the user wants to set the display 22 to be used with the longer side at the top such as to watch a horizontal picture, the user turns the second casing 20 counterclockwise with the left hand so as to set the display 22 with the longer side at the top as shown in FIG. 25D.

According to the seventh embodiment of the present invention, the portable device enables the user to stably hold the portable device while easily opening the first and second casings with one hand, and to change the orientation of the display with the one hand and/or the other hand on the portable device in the opened state. The portable device is provided with the link without requiring any new mechanism to enable the user to hold the portable device while easily opening the first and second casings with one hand, and to change the arrangement of the display.

In the above-described seventh embodiment, the user holds the portable device in the right hand while turning the second casing with the left hand so as to set the display to be used with the longer side at the top, and placing the first and second casings symmetrically as required. Alternatively, it is also possible that the portable device is adapted to become symmetrical by itself as described below.

FIGS. 26A to 26E show appearances of a portable device 9 according to an modification of the seventh embodiment, in which FIG. 26A shows the portable device 9 in the closed state, FIG. 26B shows a state where the second casing 20 of the portable device 9 has been turned to tilt slidingly with respect to the first casing 10 in the closed state, FIG. 26C shows a state where the portable device 9 has been just opened, FIG. 26D shows a transitional state to set the display 22 to be used with the longer side at the top, and FIG. 26E shows a state where the display 22 has been set to be used with the longer side at the top. The same parts as those of the portable device 8 are denoted with the same reference numerals in the drawings, and are not described here.

The portable device 9 is provided with a spring 38 stretched between the link 37 and the second casing 20. In FIGS. 26A to 26C, a concave of the hinge body 31 and a circumference of the second casing 20 abut against each other, and the second casing 20 is kept in the positions shown in FIGS. 26A to 26C opposing the force of the spring 38. Since the concave of the hinge body 31 and the circumference of the second casing 20 do not abut in the state shown in FIG. 26D, when the user removes the hand from the second casing 20, the leftward force is applied to the second casing 20 by the spring 38. Thereby, the first and second casings 10 and 20 become positioned symmetrically as shown in FIG. 26E.

In the seventh embodiment of the present invention, it is also possible that the portable device is provided with a detecting switch for detecting a case where the second casing is opened, a case where the display is set to be used with the shorter side at the top, and a case where the display is set to be used with the longer side at the top. Then, the portable device automatically starts to operate while changing the modes among various modes such as having the portable device turned on when the second casing is opened, entering into a calling mode when the display is set to be used with the shorter side at the top, and entering into a TV mode when the first display is set to be used with the longer side at the top. For the case the display is set to be used with the shorter side at the top, the mode is not limited to be applied to the calling mode, and it is also possible to apply various modes such as those appropriate for the case where the display is set to be used with the shorter side at the top, including a camera mode, a browsing mode and the like. For the case where the display is set to be used with the longer side at the top, the mode is not limited to be applied to the TV mode, and it is also possible to apply various modes such as those appropriate for the case where the display is set to be used with the longer side at the top, including a game mode.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A portable device, comprising:
   a first casing;
   a second casing; and
   a hinge which joins the first and second casings, the first and second casings being capable of opening and closing with respect to each other,
   wherein when the portable device is in a closed state where the first and second casings are closed, a first surface of the first casing is covered by the second casing and a second surface of the second casing is covered by the first casing,
   wherein when the portable device in the closed state is held by a user in a held state such that a third surface of the second casing, which is an opposite surface of the second surface of the second casing, is placed on a near side from the user and when the portable device is allowed to be in an opened state where the first and second casings are opened from the held state, the first and second surfaces are exposed to the near side, and
   wherein when the portable device is in the closed state, a first part of the first casing and a first part of the second casing face each other, a second part of the first casing protrudes from behind the second casing, and a second part of the second casing protrudes from behind the first casing, the second parts of the first and second casings being opposite to each other across the first parts of the first and second casings.

2. The portable device as defined in claim 1, wherein:
   the portable device in the closed state is adapted to be held by a user in a properly held state where the second casing is placed over the first casing and the hinge is placed on a far side from the user; and
   when the portable device in the closed state is held by the user in the properly held state, the second part of the first casing protrudes to a left-hand side and the second part of the second casing protrudes to a right-hand side, seen from the user.

3. The portable device of claim 1, wherein when the portable device is in the opened state, an entirety of the first surface and an entirety of the second surface are exposed to the near side, and the portable device is foldable between the opened state and the closed state.

4. The portable device of claim 3, wherein the hinge is formed at first end portions of the first and second casings, and the first and second casings each having first and second lateral sides adjacent to the first end portions, wherein the second casing protrudes from behind the first casing from one of the first and second lateral sides, and wherein the first casing protrudes behind the second casing from the other of the first and second lateral sides.

5. A portable device, comprising:
   a first casing;
   a second casing; and
   a hinge which joins the first and second casings, the first and second casings being capable of opening and closing with respect to each other,
   wherein when the portable device is in a closed state where the first and second casings are closed, a first surface of the first casing is covered by the second casing and a second surface of the second casing is covered by the first casing,
   wherein when the portable device in the closed state is held by a user in a held state such that a third surface of the second casing, which is an opposite surface of the second surface of the second casing, is placed on a near side from the user and when the portable device is allowed to be in an opened state where the first and second casings are opened from the held state, the first and second surfaces are exposed to the near side, and
   wherein when the portable device is in an opened state where the first and second casings open, the portable device presents a substantially rectangular appearance, and the turn axis of the hinge is oblique to a line perpendicular to a longitudinal side of the substantially rectangular appearance of the portable device.

6. The portable device as defined in claim 5, wherein:
   when the portable device is in a closed state where the first and second casings close, the portable device is adapted to be held by a user in a properly held state where the second casing is placed over the first casing and the hinge is placed on a far side from the user; and
   when the portable device in the closed state is held by the user in the properly held state, the turn axis of the hinge is tilted counterclockwise with respect to the line perpendicular to the longitudinal side of the substantially rectangular appearance of the portable device, seen from the user.

7. The portable device of claim 5, wherein when the portable device is in the closed state, a first part of the first casing and a first part of the second casing face each other, a second part of the first casing protrudes from behind the second casing, and a second part of the second casing protrudes from behind the first casing, the second parts of the first and second casings being opposite to each other across the first parts of the first and second casings.

8. A portable device, comprising:
a first casing;
a second casing;
a hinge which joins the first and second casings, the first and second casings being capable of opening and closing with respect to each other, each of the first and second casings having an inside surface coming inside when the portable device is in a closed state where the first and second casings close; and
wherein when the portable device is in a closed state where the first and second casings are closed, the inside surfaces of the first and second casings face each other,
wherein when the portable device in the closed state is held by a user in a held state such that an outer surface of the second casing, which is opposite to the inside surface of the second casing, is placed on a near side from the user and when the portable device is allowed to be in an opened state where the first and second casings are opened from the held state, the inside surfaces of the first and second casings are exposed to the near side, and
a tilting device which, when the portable device is in the closed state, allows one of the first and second casings to turn to tilt along a plane parallel to the inside surface of the one of the first and second casings with respect to the other of the first and second casings between a non-aligned position and an aligned position, wherein:
in the nonaligned position, the one of the first and second casings is tilted in a predetermined direction by a predetermined angle with respect to the other of the first and second casings, a first part of the first casing and a first part of the second casing face each other, a second part of the first casing protrudes from behind the second casing, and a second part of the second casing protrudes from behind the first casing; and
in the aligned position, the second part of the first casing does not protrude from behind the second casing, and the second part of the second casing does not protrude from behind the first casing.

9. The portable device as defined in claim 8, further comprising a click device which is adapted to keep the one of the first and second casings in each of the nonaligned position and the aligned position.

10. The portable device as defined in claim 8, further comprising a tilt regulating device which is adapted to regulate tilt of the one of the first and second casings so that the portable device presents a substantially rectangular appearance when the portable device is in an opened state where the first and second casings open.

11. The portable device as defined in claim 8, wherein when the portable device is in an opened state where the first and second casings open, the portable device presents a substantially rectangular appearance, and the turn axis of the hinge is oblique to a line perpendicular to a longitudinal side of the substantially rectangular appearance of the portable device.

12. The portable device as defined in claim 8, wherein the tilting device is placed adjacent to the turn axis of the hinge.

13. The portable device as defined in claim 8, further comprising:
a detecting device which detects at least one of acts that the first and second casings turn to open with respect to each other, the first and second casings turn to close with respect to each other, and one of the first and second casings turns to tilt with respect to the other of the first and second casings by a predetermined angle; and
a controlling device which controls an operation of the portable device according to the act detected through the detecting device.

14. A portable device, comprising:
a first casing;
a second casing;
a hinge which joins the first and second casings, the first and second casings being capable of opening and closing with respect to each other, each of the first and second casings having an inside surface coming inside when the portable device is in a closed state where the first and second casings close; and
wherein when the portable device is in a closed state where the first and second casings are closed, the inside surfaces of the first and second casings face each other,
wherein when the portable device in the closed state is held by a user in a held state such that an outer surface of the second casing, which is opposite to the inside surface of the second casing, is placed on a near side from the user and when the portable device is allowed to be in an opened state where the first and second casings are opened from the held state, the inside surfaces of the first and second casings are exposed to the near side, and
a tilting device including an elastic member which, when the portable device is in the closed state, allows one of the first and second casings to tilt along a plane parallel to the inside surface of the one of the first and second casings with respect to the other of the first and second casings between a nonaligned position and an aligned position, wherein:
in the nonaligned position, the one of the first and second casings is tilted by a predetermined angle with respect to the other of the first and second casings, a first part of the first casing and a first part of the second casing face each other, a second part of the first casing protrudes from behind the second casing, and a second part of the second casing protrudes from behind the first casing; and
in the aligned position, the second part of the first casing does not protrude from behind the second casing, and the second part of the second casing does not protrude from behind the first casing.

15. The portable device as defined in claim 14, further comprising a click device which is adapted to keep the one of the first and second casings in each of the nonaligned position and the aligned position.

16. The portable device as defined in claim 14, further comprising a tilt regulating device which is adapted to regulate tilt of the one of the first and second casings so that the portable device presents a substantially rectangular appearance when the portable device is in an opened state where the first and second casings open.

17. The portable device as defined in claim 14, wherein when the portable device is in an opened state where the first and second casings open, the portable device presents a substantially rectangular appearance, and the turn axis of the hinge is oblique to a line perpendicular to a longitudinal side of the substantially rectangular appearance of the portable device.

18. The portable device as defined in claim 14, wherein the tilting device is placed adjacent to the turn axis of the hinge.

19. The portable device as defined in claim 14, further comprising:
a detecting device which detects at least one of acts that the first and second casings turn to open with respect to each other, the first and second casings turn to close with respect to each other, and one of the first and second casings turns to tilt with respect to the other of the first and second casings by a predetermined angle; and a controlling device which controls an operation of the portable device according to the act detected through the detecting device.

20. A portable device, comprising:

a first casing;

a second casing which has a display;

a hinge which joins the first and second casings, the first and second casings being capable of opening and closing with respect to each other;

wherein when the portable device is in a closed state where the first and second casings are closed, a first surface of the first casing is covered by the second casing and a second surface of the second casing is covered by the first casing, wherein when the portable device in the closed state is held by a user in a held state such that a third surface of the second casing, which is an opposite surface of the second surface of the second casing, is placed on a near side from the user and when the portable device is allowed to be in an opened state where the first and second casings are opened from the held state, the first and second surfaces are exposed to the near side, and a tilting device which allows the second casing to turn to tilt along a plane parallel to the display with respect to the first casing; and a click device which is adapted to keep the second casing tilting with the tilting device in each of a first position where the display is set to be used with a shorter side at a top, a second position where the display is set to be used with a longer side at the top, and a third position between the first position and the second position, wherein the first and second casings are capable of turning to open and close with respect to each other when the second casing is kept in the third position.

21. The portable device as defined in claim 20, wherein the tilting device is placed adjacent to the turn axis of the hinge.

22. The portable device as defined in claim 20, further comprising:

a detecting device which detects at least one of acts that the first and second casings turn to open with respect to each other, the first and second casings turn to close with respect to each other, and one of the first and second casings turns to tilt with respect to the other of the first and second casings by a predetermined angle; and a controlling device which controls an operation of the portable device according to the act detected through the detecting device.

* * * * *